(12) United States Patent
Komamura et al.

(10) Patent No.: US 8,477,704 B2
(45) Date of Patent: Jul. 2, 2013

(54) RADIO RESOURCE ASSIGNMENT METHOD AND BASE STATION DEVICE

(75) Inventors: Shinnosuke Komamura, Yokohama (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 316 days.

(21) Appl. No.: 12/826,202

(22) Filed: Jun. 29, 2010

(65) Prior Publication Data

US 2011/0158187 A1 Jun. 30, 2011

(30) Foreign Application Priority Data

Aug. 25, 2009 (JP) ................................ 2009-193785

(51) Int. Cl.
*H04W 4/00* (2009.01)
(52) U.S. Cl.
USPC ........................... 370/329; 370/338; 455/450
(58) Field of Classification Search
USPC ......... 370/229–235, 252, 328–330, 336–338, 370/341–345, 468; 455/450–453
See application file for complete search history.

(56) References Cited

U.S. PATENT DOCUMENTS

| 6,788,943 | B1 | 9/2004 | Hamalainen et al. | |
|---|---|---|---|---|
| 6,950,656 | B1* | 9/2005 | Bahk et al. | 455/436 |
| 7,835,750 | B2* | 11/2010 | Khan | 455/447 |
| 2004/0203832 | A1* | 10/2004 | An | 455/453 |
| 2008/0057934 | A1 | 3/2008 | Sung et al. | |
| 2009/0042579 | A1 | 2/2009 | Kitajima | |
| 2009/0059856 | A1* | 3/2009 | Kermoal et al. | 370/329 |
| 2009/0179755 | A1 | 7/2009 | Bachl et al. | |
| 2009/0201867 | A1 | 8/2009 | Teo et al. | |

FOREIGN PATENT DOCUMENTS

| JP | 2008-061250 | 3/2008 |
|---|---|---|
| JP | 2009-021787 | 1/2009 |
| JP | 2009-044397 | 2/2009 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 8); 3GPP TS 36.423 v.8.4.0 (Dec. 2008); pp. 1-89.
European Patent Office extended search report and search opinion on Application No. 10006639.8 dated Dec. 3, 2010; 8 pages.

* cited by examiner

*Primary Examiner* — Kan Yuen
(74) *Attorney, Agent, or Firm* — Foley & Lardner LLP

(57) ABSTRACT

A radio resource assignment method, wherein it is determined at a predetermined timing whether a cell is congested or not; the determination result is notified to adjacent base stations; results of determination of congestion or non-congestion received from adjacent base stations are stored; when it is determined that the base station is not congested, a check is made whether or not the adjacent base stations are congested; when the adjacent base stations are congested, the use of the resource blocks is restricted to decide an empty resource block; and information on the decided resource block is notified to the adjacent base stations. When it is determined that the base station is congested, the information on the empty resource blocks received from the adjacent base stations is checked, and the empty resource blocks are assigned to mobile terminal devices within the cell.

12 Claims, 25 Drawing Sheets

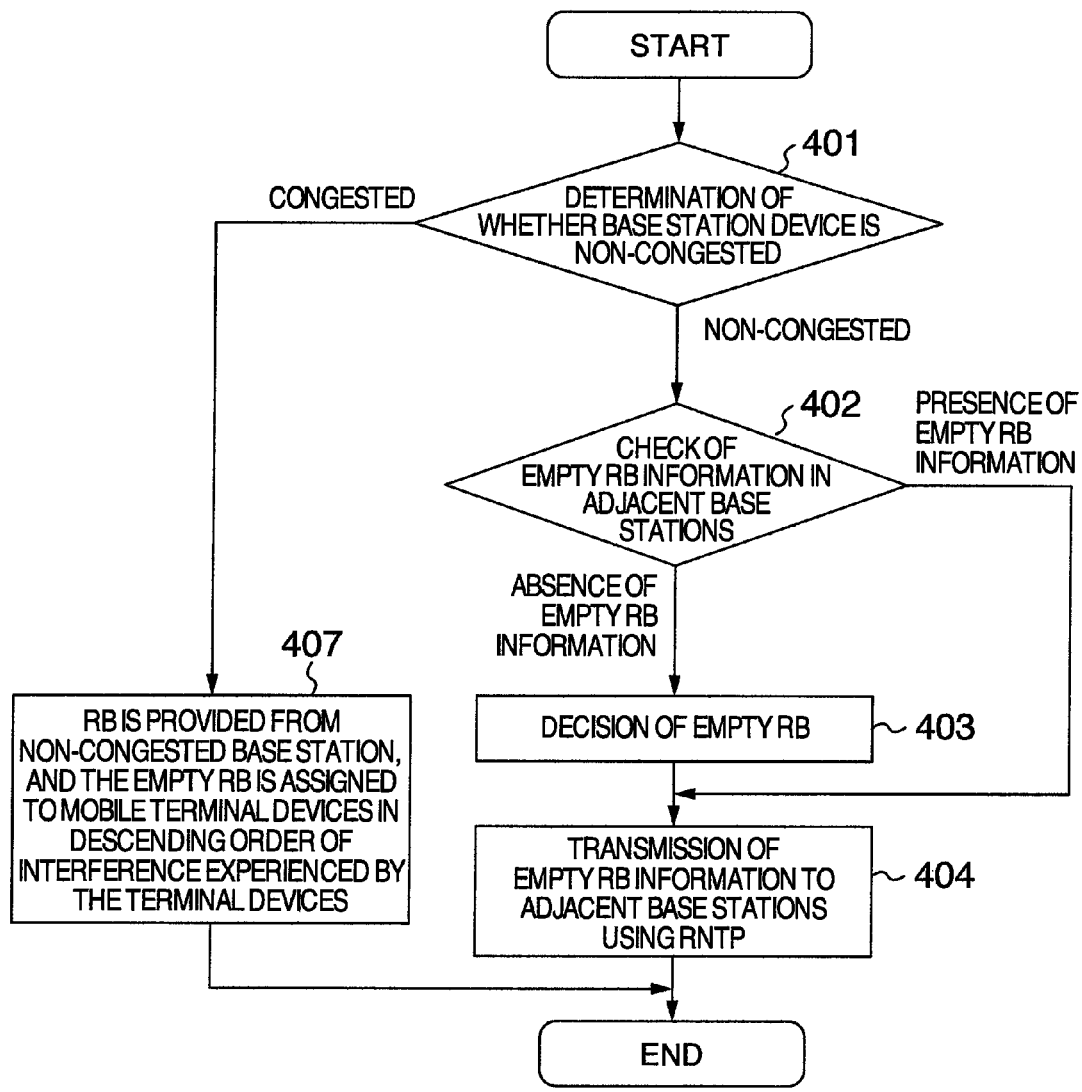

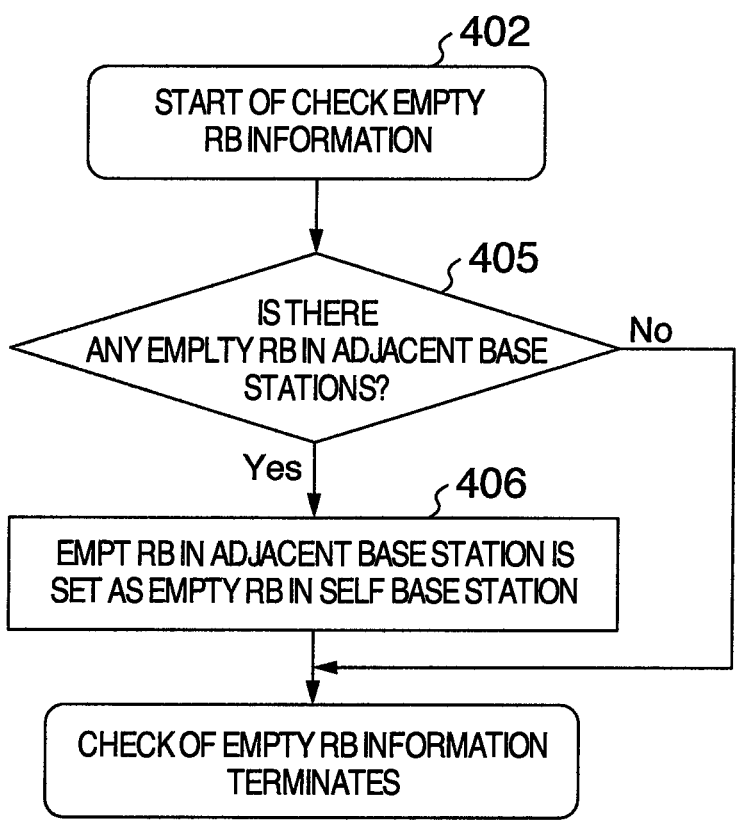

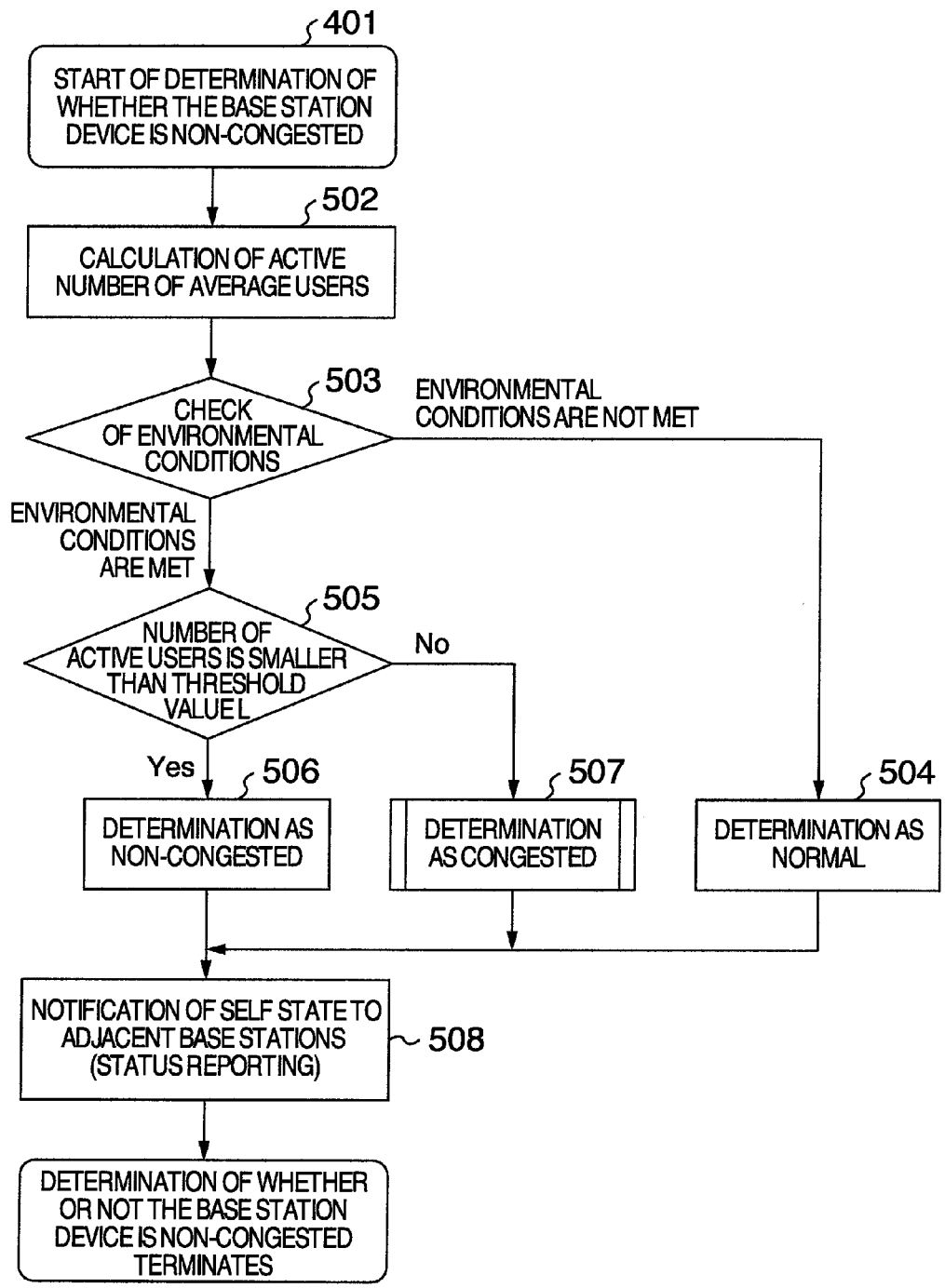

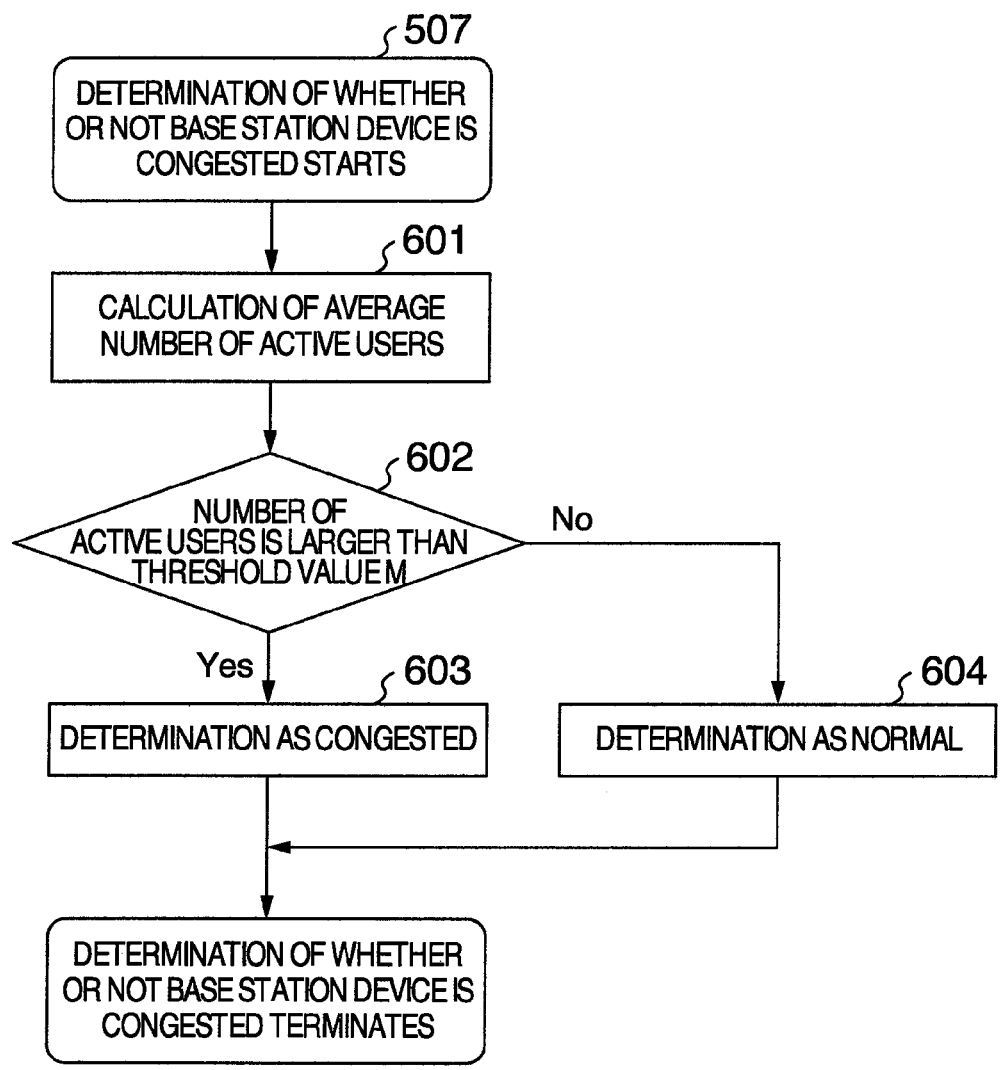

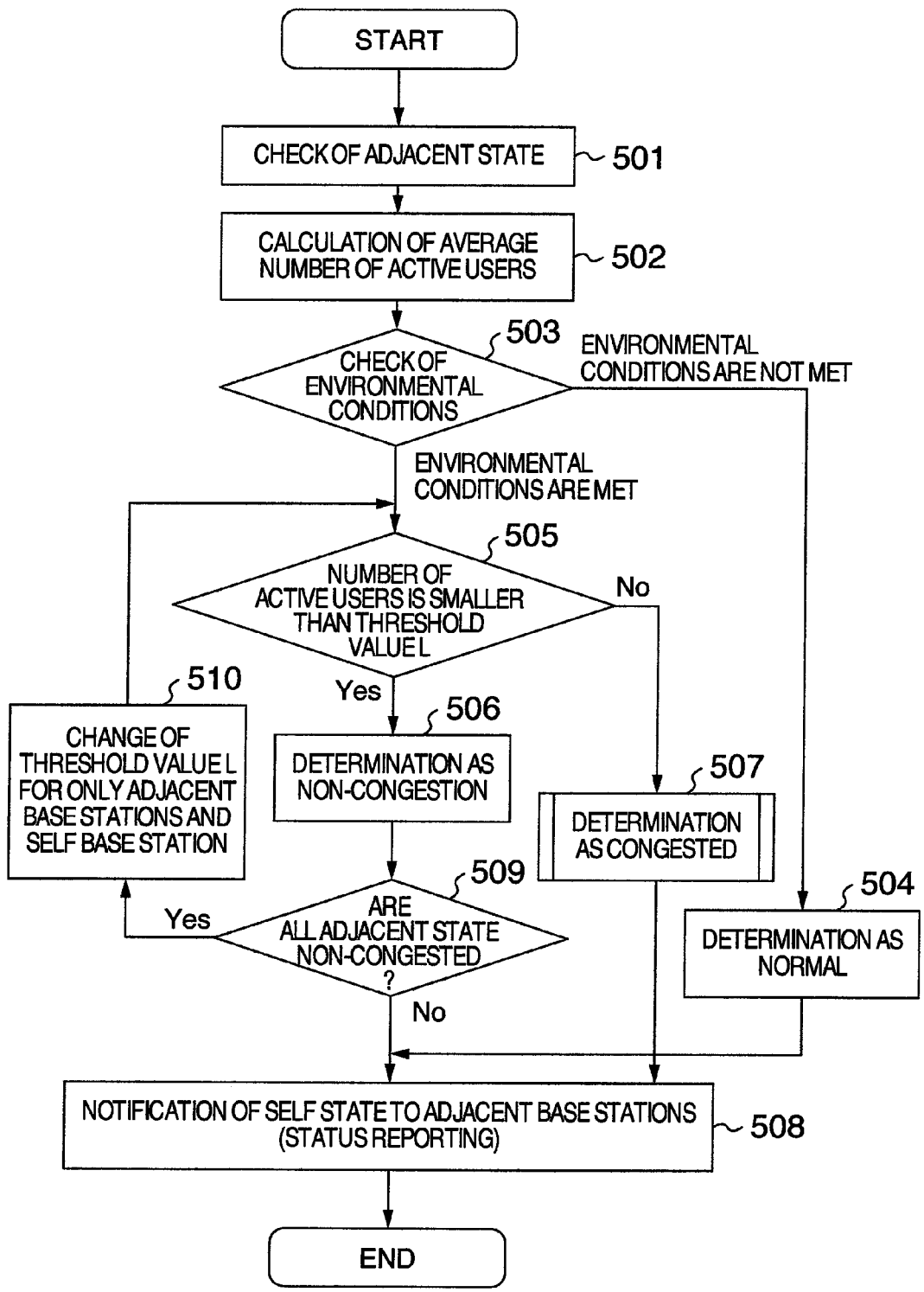

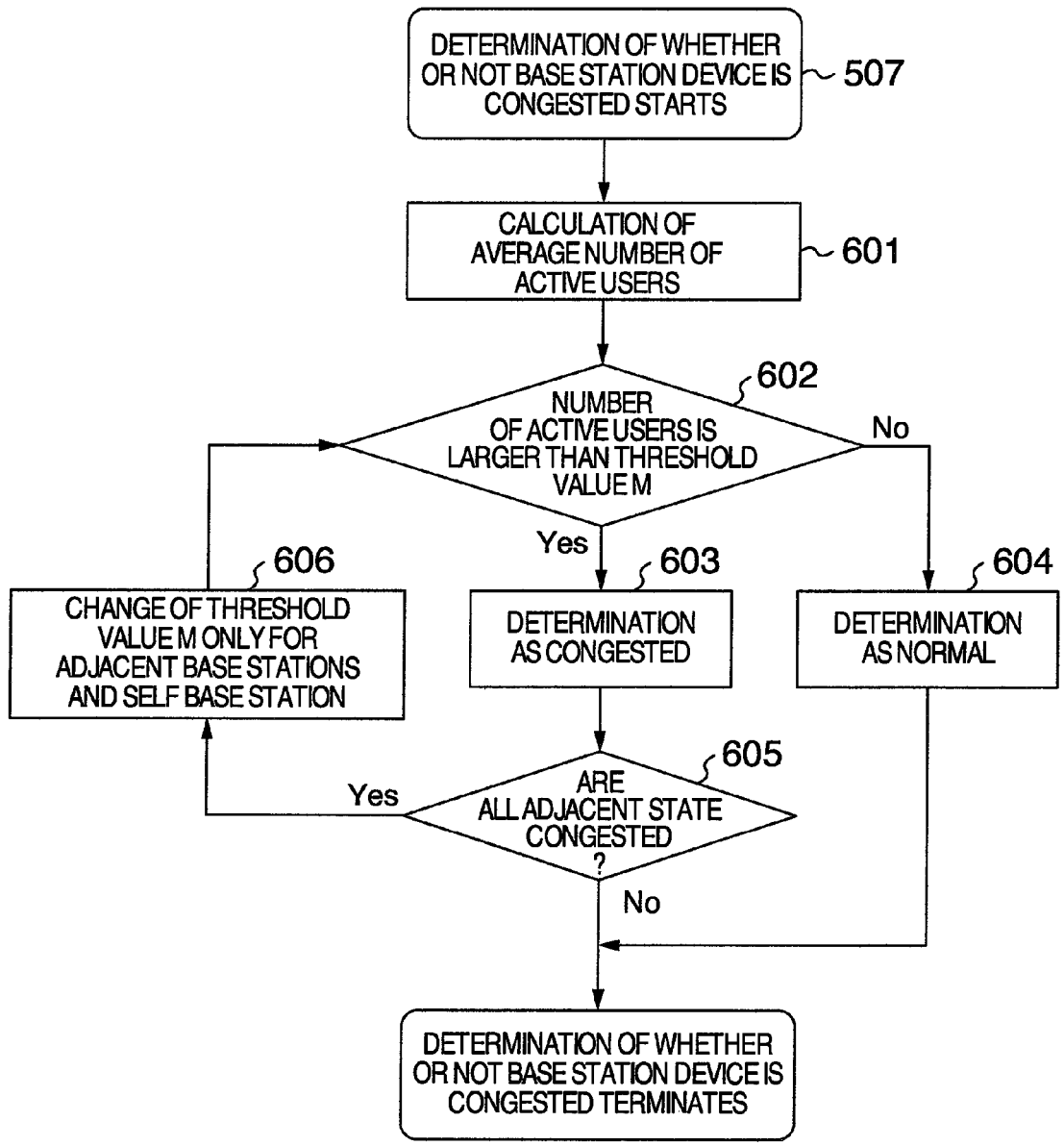

FIG. 25

| SECTOR | RB | EMPTY RB INFORMATION |
|---|---|---|
| SECTOR 1 | RB1 | 1 |
| | RB2 | 1 |
| | ⋮ | |
| | RBn | 0 |
| SECTOR 2 | RB1 | 0 |
| | RB2 | 0 |
| | ⋮ | |
| | RBn | 0 |
| ⋮ | RB1 | 1 |
| | RB2 | 1 |
| | ⋮ | |
| | RBn | 1 |
| SECTOR m | RB1 | 0 |
| | RB2 | 1 |
| | ⋮ | |
| | RBn | 1 |

RADIO RESOURCE ASSIGNMENT METHOD AND BASE STATION DEVICE

INCORPORATION BY REFERENCE

The present application claims priority from Japanese application JP 2009-193785 filed on Aug. 25, 2009, the content of which is hereby incorporated by reference into this application.

BACKGROUND OF THE INVENTION

The present invention relates to a mobile communications technology. More particularly, the present invention relates to a radio resource assignment technology for preventing interference at a sector boundary or at a cell boundary in a mobile wireless communications system.

As a mobile telecommunications technology advances, a ubiquitous network is expected to be implemented which frees users from restrictions, such as places where they use mobile terminal devices or speed at which they travel, and allows them to connect to a network more freely.

The mobile wireless communications system comprises a plurality of base station devices and a plurality of mobile terminal devices for performing wireless communications with the base station devices. The plurality of base station devices are disposed in dispersion, providing areas called cells, which enable wireless communications, within a range in which radio waves transmitted from each base station device are reachable. The base station device has sometimes a plurality of areas, referred to as sectors, which are provided by angularly dividing the cell through the use of a directional antenna and in which the radio waves are reachable. Typically, a sector is constituted of three domains by dividing the cell into three parts. The sector can also be regarded as a cell which is formed by angularly dividing a space using the directional antenna. It should be noted that the term cell is sometimes used below to mean to include both concepts of the sector and cell in the present invention.

The wireless communications system is structured to ensure that a communication path provided to a mobile terminal device is continuously handed over from one base station device to another as the mobile terminal device travels, and wireless communications is maintained while the mobile terminal device is travelling. Cell regions that are formed by the base station devices overlap one another to ensure that the handover between base station devices is performed without the communications being interrupted. When a mobile terminal device wirelessly communicates with a wireless base station in the region where cell regions overlap one another, the communications interferes with communications performed by another base station device which is located at a region where cell regions overlap one another. Such interference could produce waves disturbing the communications performed by another mobile terminal device, causing signal quality and throughput in the wireless communications to deteriorate.

A method of reducing such interference at the cell boundary or sector boundary is FFR (Fractional Frequency Reuse). This art aims to reduce interference at a particular frequency band to thereby improve throughput by causing a plurality of adjacent base station devices to share frequency resources in a coordinated manner, and weigh transmission power.

Other techniques for reducing interference include those described in Patent Document 1, Patent Document 2, and Patent Document 3. In Patent Document 1, a wireless base station extracts information on the amount of interference among cells from an uplink signal, generates uplink control information based on the information, transmits it to adjacent mobile communications terminal devices, and the terminal devices schedule uplink resources with reference to the uplink control information. In Patent Document 2, a transmission frame is divided in the time-base direction into a subchannel subset usage zone and a subchannel usage zone. The subchannel subset usage zone is divided in the frequency axis direction into a plurality of zones. A connection is assigned to a previously set zone in order of multiple priorities and defined as a priority zone, and a power value is assigned that is needed to improve the signal quality to a given level. In Patent Document 3, when user data is transmitted to a terminal station, a frame is used that comprises a segment region and a non segment region. A subchannel is assigned to a segment region. The subchannel differs for each sector and is used for the transmission of the user data to the terminal station existing in a sector edge and a cell edge which are divided in the time-base direction The non segment region is used for the transmission of the user data to the terminal station that does not exist in the sector edge and cell edge.

Turning now to standardization, a wireless communications scheme based on Orthogonal Frequency Division Multiplexing (OFDM), referred to as Long Term Evolution (LTE), is proposed by Third Generation Partnership Project (3GPP), which is one of standardization organizations. Communications between base station devices using LTE is described in Non-Patent Document 1.

PRIOR ART DOCUMENTS

Patent Document 1: JP-A-2008-61250
Patent Document 2: JP-A-2009-21787
Patent Document 3: JP-A-2009-44397
Non-Patent Document 1: 3GP TS36.423 8.3.1 Load Indication

SUMMARY OF THE INVENTION

The above described FFR assumes that the number of mobile terminal devices within each cell is uniform. In reality, however, the number of mobile terminal devices within each cell is not uniform, substantially varying depending on each cell. For example, in an area around the main terminal station, such as Shinjuku and Shibuya in Tokyo, population density is very high. However, in an area somewhat distant from there, population density is not very high. Due to such a bias, resources will be exhausted in the area where a lot of mobile terminal devices are used, while resources exceed demands in the area where the number of adjacent mobile terminal devices is small. It is conceivable that, typically, terminal devices positioned near a cell boundary are more likely to experience the exhaustion of resources than those positioned in the center of the cell where radio wave environment is good. In addition, at a cell boundary, a decline in throughput is accelerated by interference that takes place because regions overlap one another as described above. Therefore, there has been a need for technologies for avoiding interference at the cell boundary and for an effective use of adjacent resources that are large enough.

The present invention has been made to solve the above problems. It is an object of the present invention to implement fairness for each mobile terminal device at the cell boundary or at the sector boundary by causing peripheral base station devices to offer radio resources to a congested base station in a coordinated manger, and reducing interference.

It is another object of the present invention to enable the adaptive and efficient reduction of interference by making it possible to automatically change a threshold value for determining whether or not a base station device is congested.

It is another object of the present invention to reduce interference at the cell boundary and the sector boundary even when congested base station devices adjoin each other by causing the base station devices to coordinate together.

According to the present invention, in order to overcome the above problems, it is determined at a predetermined timing whether or not a cell is congested, the result of the determination is notified to adjacent base stations, and the result of the determination of congestion or non-congestion received from the adjacent base stations is stored. When a base station determines that the cell is not congested, it checks whether or not adjacent base stations are congested. When the adjacent base stations are congested, the use of resource blocks is voluntarily restricted to decide an empty resource block, and information on the decided an empty resource block is notified to the adjacent base stations.

When the base station determines that a cell is congested, as the result of determination of congestion or non-congestion, it checks information on empty resource blocks received from the adjacent base stations, and the empty resource blocks are assigned to the mobile terminal devices within the cell.

More specifically, the determination of congestion or non-congestion is performed by comparing the average number of mobile terminal devices within the cell connected at every given time period or average throughput of the mobile terminal devices at every given time period with a previously set threshold value.

Furthermore, when the base station and all of the adjacent base stations are determined to be congested, the threshold value is changed by only a previously set value and the determination of congestion or non-congestion is performed again.

Moreover, when both the base station and the adjacent base stations are determined to be congested, resource blocks are distributed on a previously set ratio so that frequency bands will not overlap between the base station and the adjacent base stations, and the distributed radio resources are assigned to mobile terminal devices within the cell of each of the base station and adjacent base stations.

According to the present invention, interference can be reduced by causing peripheral base station devices to coordinate to offer radio resources to a base station device that is congested due to the wireless communications, thus making it possible to achieve fairness for each mobile terminal device at the cell boundary or at the sector boundary.

Furthermore, according to the present invention, it is possible to automatically adjust a threshold value for determining whether or not a base station device is congested, thus making it possible to efficiently and adaptively reduce the interference.

Other objects, features and advantages of the invention will become apparent from the following description of the embodiments of the invention taken in conjunction with the accompanying drawings.

BRIEF DESCRIPTION OF THE DRAWINGS

FIG. 12 is a flow chart explaining a processing of determining whether or not an empty resource exists in the base station device and a notification processing;

FIG. 13 is a flow chart explaining a method of checking the empty RB information in the base station device;

FIG. 14 is a flow chart explaining a processing of determining congestion/non-congestion of the base station device according to an embodiment of the present invention;

FIG. 15 is a flow chart explaining a processing of determining whether the base station device is congested according to an embodiment of the present invention;

FIG. 16 is a flow chart explaining a processing of determining congestion/non-congestion of the base station device is congested according to an embodiment of the present invention;

FIG. 17 is a flow chart explaining an embodiment of a processing of determining whether or not the base station device is congested;

FIG. 25 is a diagram representing an example of a configuration of an information table of empty RB.

DESCRIPTION OF EMBODIMENTS

Embodiments of the present invention will be described below.

Figure 2:
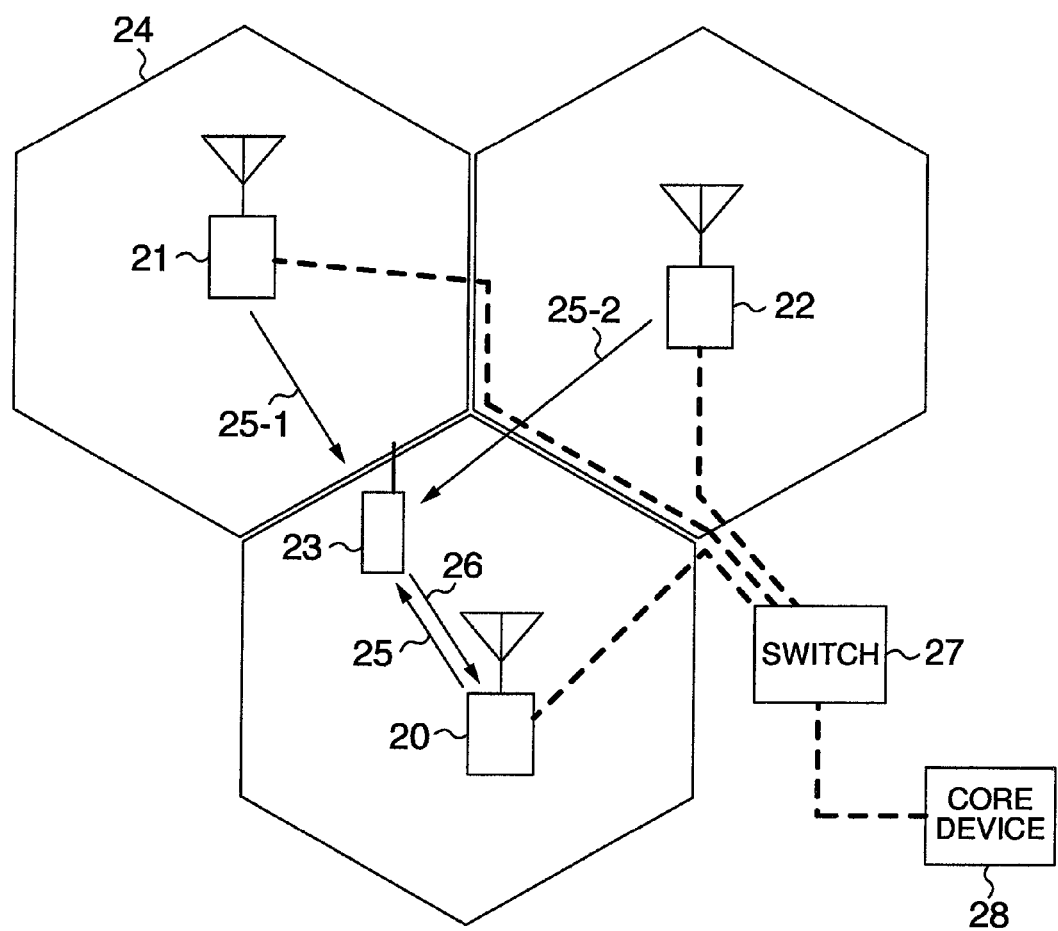
FIG. 2 is a diagram representing an example of a configuration of a mobile wireless communications system.

FIG. 2 shows an exemplary configuration of a mobile wireless communications system.

Base station devices 20 to 22 are in communications with a core device 28 in order to connect to a core network. A signal from the core device 28 is inputted to, for example, the base station device 20 via a switch 27. The base station device 20 converts the signal from the core device 28 into a high frequency signal for transmission to a mobile terminal device 23 via a wireless signal 25. The mobile terminal device 23 receives and signal-processes the radio signal 25, thus converting the radio signal into information, and establishes communications with the core device 28. The information generated by the mobile terminal device 23 is converted into a high frequency signal by the mobile terminal device 23 and is transmitted to the base station device 20 via the radio signal 26. The radio signal 26 transmitted from the mobile terminal device 23 and received by the base station device 20 is converted into information through a signal processing procedure. Then, it is transmitted to the core device 28 via the switch 27. The plurality of base station devices 20 to 22 connect to the core device 28 via the switch 27, with each device transmitting and receiving different signals. When the mobile terminal device 23 exists at a boundary between the base station device 20 and the adjacent base station device 21, or between the base station device 20 and the adjacent base station device 22, as is shown in FIG. 2, the radio signal 25 directed to the mobile terminal device 23 interferes with radio signals 25-1, 25-2 received from base station devices 21, 22, respectively.

A method of reducing the interference at this cell boundary is the aforementioned FFR (Fractional Frequency Reuse). According to the FFR, a plurality of adjacent base station devices share frequency resources, weigh transmission power, and suppress the interference at a specific frequency band, thus increasing throughput. This will be described a bit more in detail in the following section.

Figure 3:
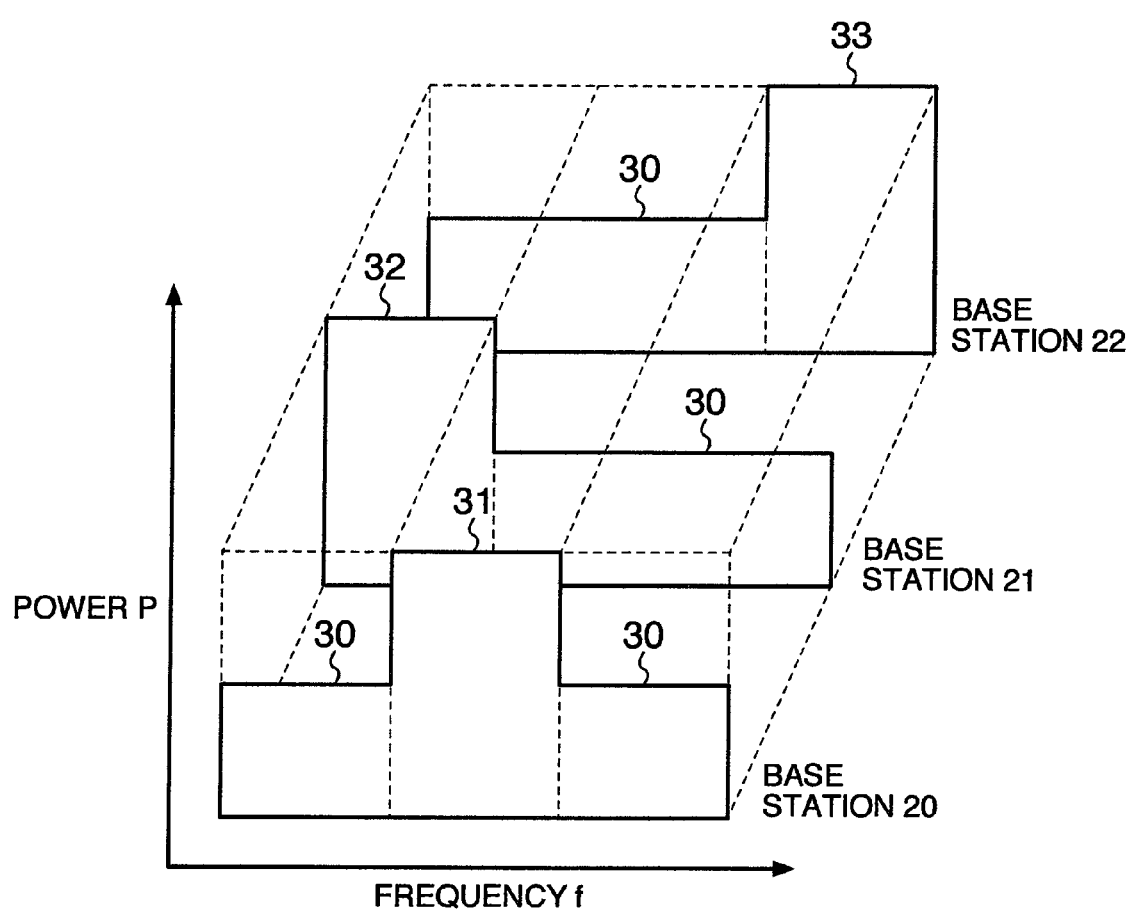
FIG. 3 is a diagram explaining the distribution of a radio resource of a base station device during application of FFR.

FIG. 3 is a diagram explaining the distribution of radio resources of the base station device during application of FFR.

In FIG. 3, a vertical axis represents power P, while a lateral axis represents frequency f. Take, for example, the base station device 20. Low power frequency represented by 30 is assigned to a central region of a cell, and high power frequency represented by 31 which does not interfere with other cells is assigned to a cell boundary region. In the same manner, also in the base station devices 21, 22, low power frequency 30 is assigned to the central region of the cell and frequencies 32, 33 are assigned to the cell boundary regions. As just described, according to the FFR, the same frequency is not assigned to the mobile terminal devices at the cell boundary region or boundary region between the adjacent base stations, thus avoiding the interference at the cell boundary region.

Here, the assignment of the frequency in this manner means that a whole frequency band is used at the cell boundaries of the three base station devices that are adjacent to each other. This is referred to as a use under "a reuse 3" (frequency repetition 3. Hereinafter, this is referred to as R3). If the frequency that is used by adjacent base station devices differs, radio signals do not interfere with each other. Thus, interfering radio signals are not transmitted from the adjacent base stations. It will be from base stations next to the adjacent base stations that such interfering radio signals are transmitted. However, since those base stations are distantly located, the interfering power of the radio signals transmitted from them is expected to be smaller. FRR is a technique that aims to reduce an impact from the interference in this manner. In contrast, the frequency 30, which is a resource assigned to a mobile terminal device at the central region of the cell, is repeatedly used also by the adjacent base station devices. This is referred to as a use under "a reuse 1" (frequency repetition 1. Hereinafter, this is referred to as R1).

A description will be given below with reference to FIG. 4 to how frequencies are assigned to a plurality of base station devices when FFR is used.

Figure 4:
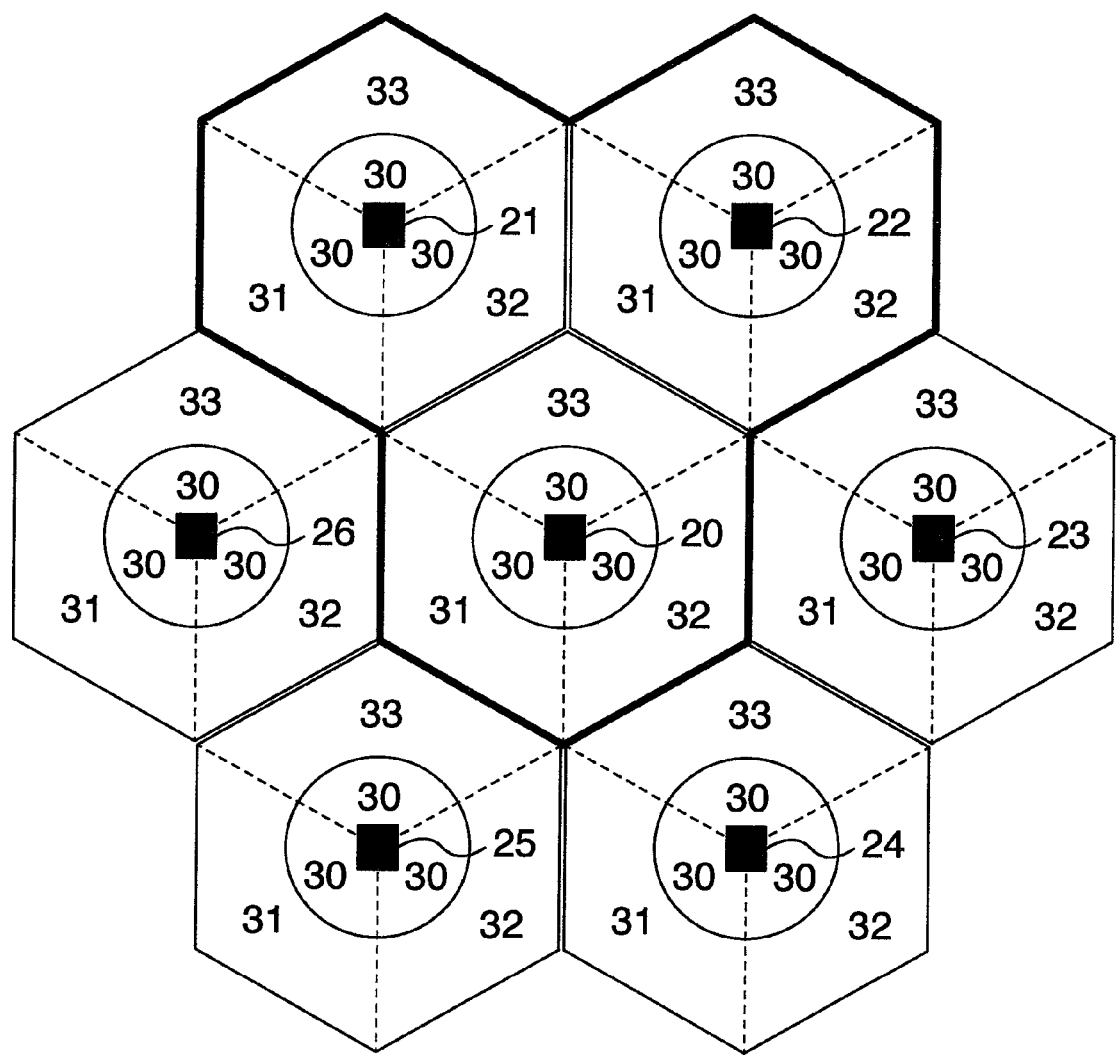
FIG. 4 is a diagram representing an example of frequency distribution when FFR is applied to a plurality of adjacent base station devices.

FIG. 4 is a diagram showing an example of frequency distribution during the application of FRR to a plurality of adjacent base station devices. FIG. 4 represents seven base station devices, 20 to 26. The base station devices each have 3 sectors that cover a base station device, which is represented by square black and located in the center, and three fan-shape regions. The sector is the name of a cell that is formed by angularly dividing a space using directivity of an antenna.

Each sector is divided into two. One is a central region near to a base station device such as 20. The other is a boundary region near to cell boundary. In the central region, the frequency 30, which was explained in the above with reference to FIG. 3 and is used under the "reuse 1," is used. In contrast, in the boundary region, three frequencies, 31, 32, and 33, are assigned in a manner that prevents interference with adjacent cells. Thus, the interference from the adjacent base station devices is alleviated.

Next, the effect of FRR will be explained using the result of a simulation.

Figure 5:
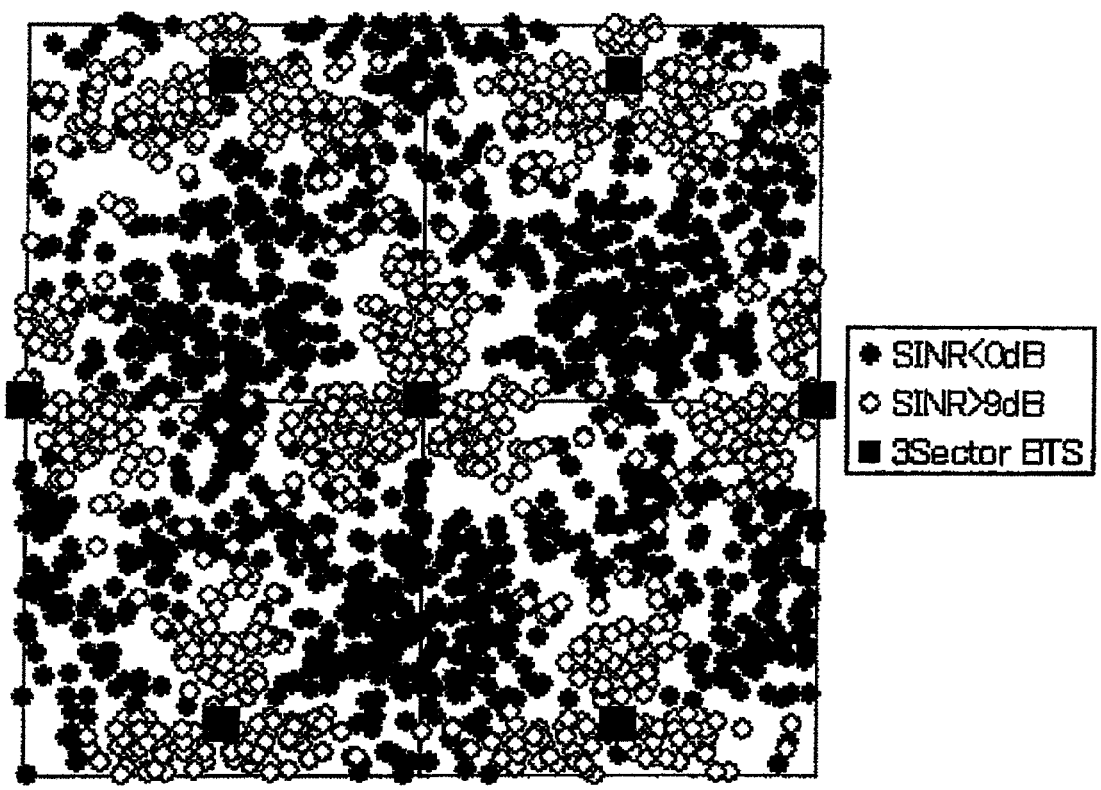
FIG. 5 is a diagram representing the result of a simulation of an SINR distribution when FFR is not used.

FIG. 5 shows a simulation result of SINR distribution when FRR is not employed. In this simulation, shadowing due to obstacles, antenna patterns of the base station device and propagation losses are considered.

In FIG. 5, black squares noted as "3 sector BTS" indicate the positions of the base station devices. The simulation is performed in three sectors constructed to have directions, including an upper direction of the base station device that is assumed as 0 degrees, directions of 120 and 240 degrees. The positions of white circles indicate that SINR is higher than 9 db and signal quality is excellent. The positions of black circles indicate that SINR is lower than 0 db and signal quality is poor. The result indicates that black circles are highly visible at the boundary regions between adjacent sectors or cells, showing that signal quality is poor.

Figure 6:
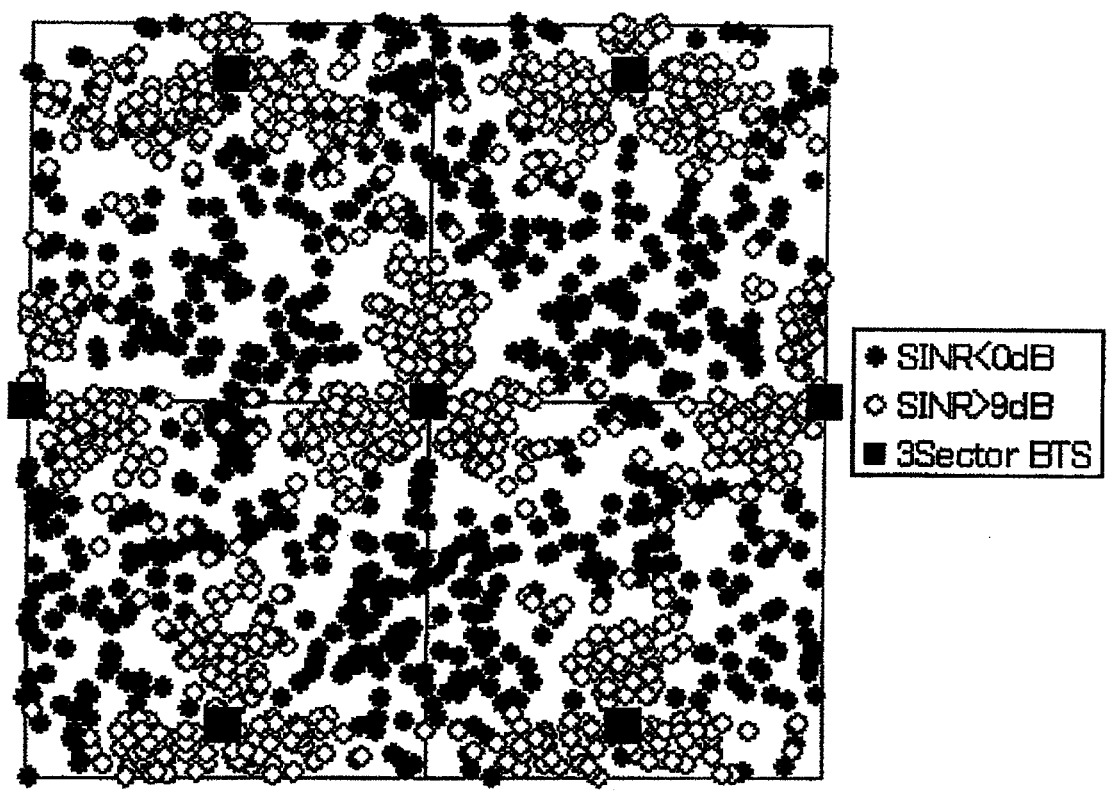
FIG. 6 is a diagram representing the result of a simulation of an SINR distribution when FFR is used.

FIG. 6 shows a simulation result of SINR distribution when FFR is employed. This is the result of using FRR based on the frequency assignment illustrated in FIG. 3. As compared with the case in which FRR is not employed as illustrated in FIG. 5, it is obvious that the signal quality has been improved at the boundary regions between adjacent sectors or cells.

Figure 7:
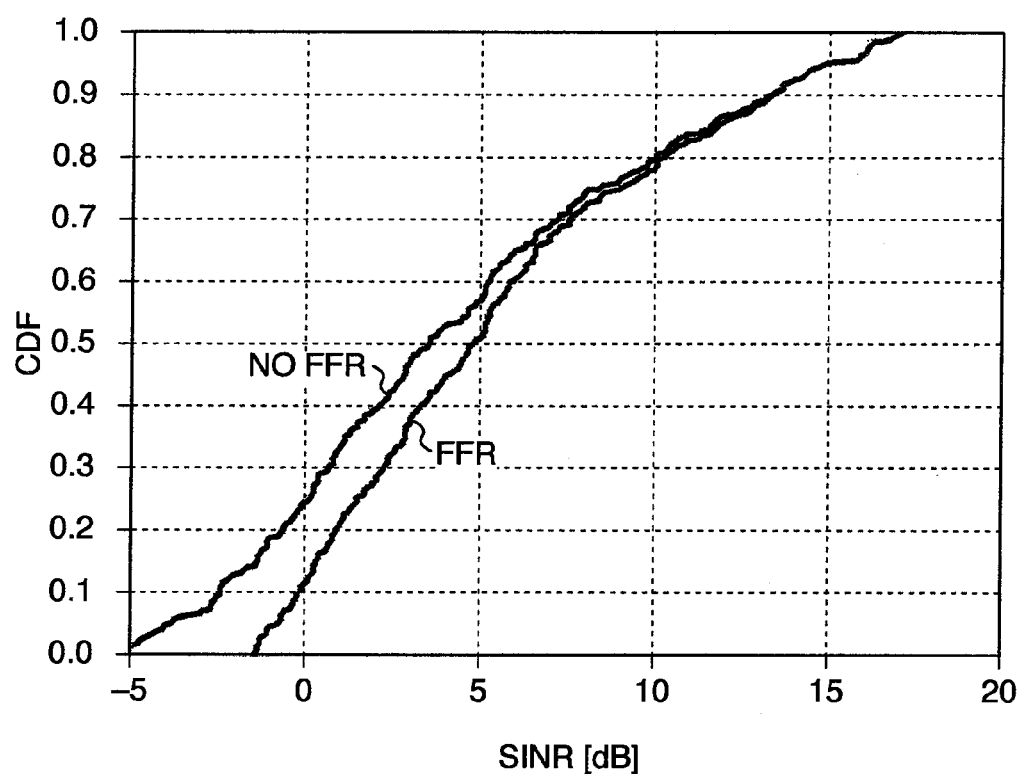
FIG. 7 is a graph representing the result of a simulation using a probability distribution function (CDF)

FIG. 7 shows a graph in which the simulation results in FIGS. 5 and 6 are transformed into a probability distribution function (CDF).

It can seen how a region of low SINR, in particular, is improved, from a comparison between the simulation without using FRR and the simulation using FRR, through the use of a probability distribution function.

As previously described in the "Summary of the Invention", FRR is based on the assumption that the number of the mobile terminal devices in each cell is uniform. In reality, however, that is not the case. The number of the mobile terminal devices in each cell varies greatly from cell to cell. Therefore, a technique for reducing interference at the cell boundary using FRR that is further advanced according to the present invention will be described in the following.

Embodiment 1

Embodiment 1 according to the present invention will be hereinafter explained.

To begin with, the construction of a base station device and operations of each unit of the base station device will be explained.

Figure 8:
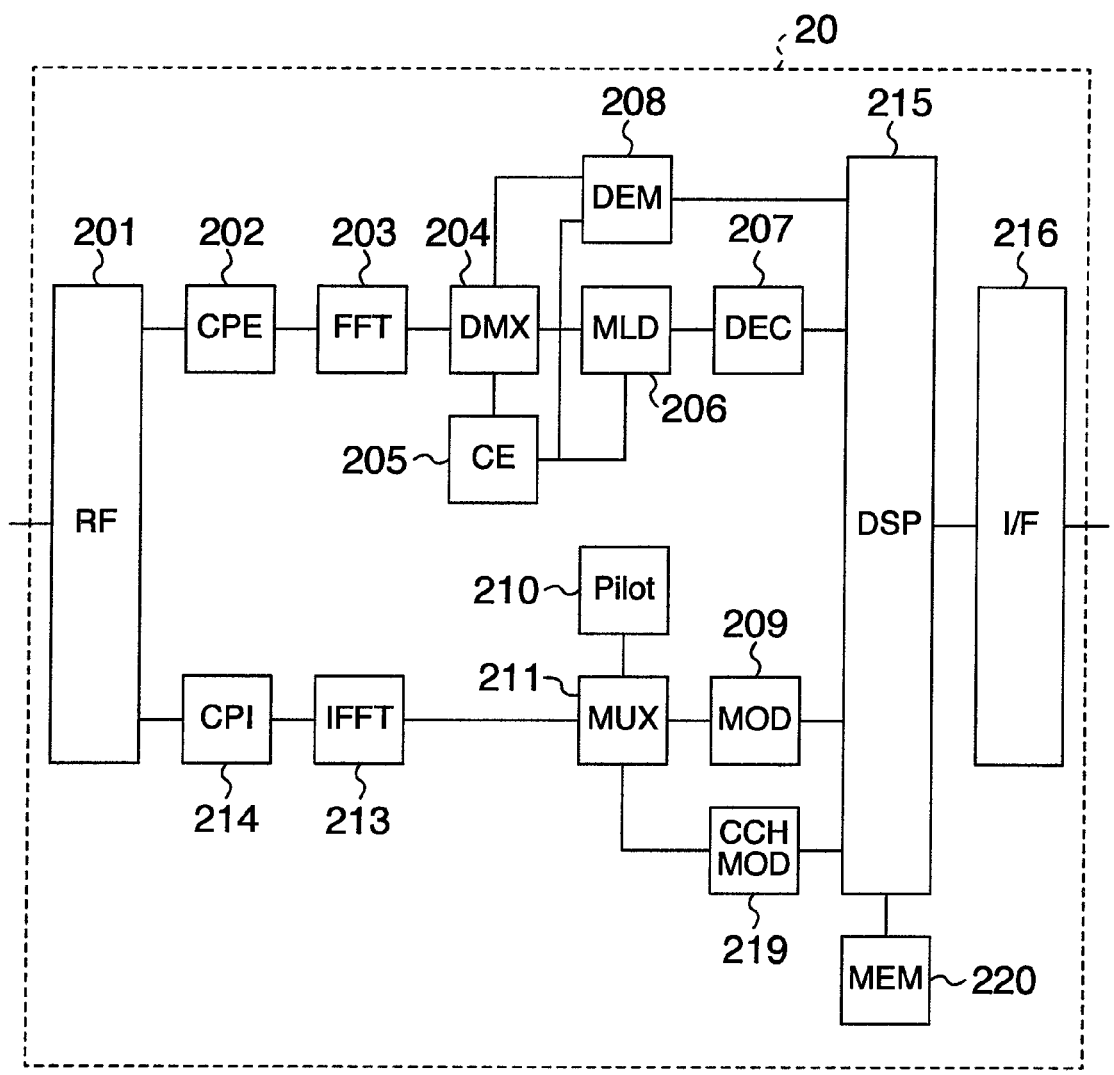
FIG. 8 is a diagram explaining a configuration of a base station device according to an embodiment of the present invention.

FIG. 8 is a diagram illustrating the construction of the base station device.

First, an antenna (not shown) is connected to the left side of the device depicted in FIG. 8. An analog signal received by the antenna is inputted into an RF (Radio Frequency) unit 201 from the left side of the FIG. 8 and converted into a digital signal. CP (Cyclic Prefix) is extracted from the digital signal by a CP extraction unit 202 at a timing specific to the base station. CP is a certain redundant duration applied to an OFDM (Orthogonal Frequency Division Multiplexing) signal so as to remove multipath interference. The received signal, from which CP is extracted, is multiplied by FFT at a FFT (Fast Fourier Transform) unit 203. A time domain signal is divided into a frequency domain signal and then separated into information for each sub-carrier by the FFT unit. A DMS (DeMultiplex) unit 204 recognizes the received signal as information that is divided by frequency×time, and a channel is divided according to the resource assignment that is previously set by a scheduler, which is implemented by a DSP (Digital Signal Processor) unit 215. The DSP 215 determines whether the base station device is congested or not congested, checks resource blocking information, schedules FFR or the like. These are features of the present invention and will be discussed in detail below.

The received signal is divided mainly into a pilot signal, a control signal, or a user data signal. Here, the pilot signal (or reference signal) is sent to a CE (Channel Estimation) unit 205 and used for the estimation of a propagation path. The control signal is sent to a DEM unit 208 and is decoded and demodulated by performing MMSE (Minimum Mean Square Error) using a propagation estimation result that is calculated by the CE unit 205. The user data signal is sent to an MILD (Maximum Likelihood Determination) unit 206 and is subjected to MLD using the propagation estimation result calculated by the CE unit 205. A log likelihood ratio calculated by the MLD unit 206 is inputted into a DEC (Decoder) unit 207, where it is subjected to a trubo decoding processing. Obtained information is inputted into the DSP 215 and subjected to a layer 2 (L2) processing. Then, it is sent to the core side device 28 shown in FIG. 2 via a network interface 216.

Meanwhile, the user data information transmitted from the core device 28 depicted in FIG. 2 is recorded in a memory 220 via a network interface 216. Then, it is taken out by instructions of the scheduler that is implemented by the DSP 215, and subjected to turbo decoding, coding processing such as interleaving, and modulation processing for modulation into such as a QPSK (Quadrature Phase Shift Keying) code in MOD (Modulation) unit 209. The modulated information is disposed at a resource, which is instructed by a scheduler that is implemented by a MUX unit 211. At this time, a pilot generated by a pilot generation unit 210 and a control channel generated by a control channel modulation unit 219 are disposed together. The control channel is created by the DSP 215 and subjected to modulation processing by a CCHMOD (Control Channel Modulation) unit 219. Information to be transmitted is integrated by the MUX unit 211 and transformed into a time domain by an IFFT (Inverse-FFT) unit 213. Then, after CP is added thereto by a CPI (Cyclic Prefix Insertion) unit 214, it is inputted into the RF unit 201. Then, it is transformed from a digital signal into a high frequency signal and then amplified before being outputted to the antenna (not shown) by the RF unit 201.

Other constructions of the base station device generally include one in which the RF unit and another component (called a control unit) of the base station device 20 are separated as shown in FIG. 8.

Figure 9:
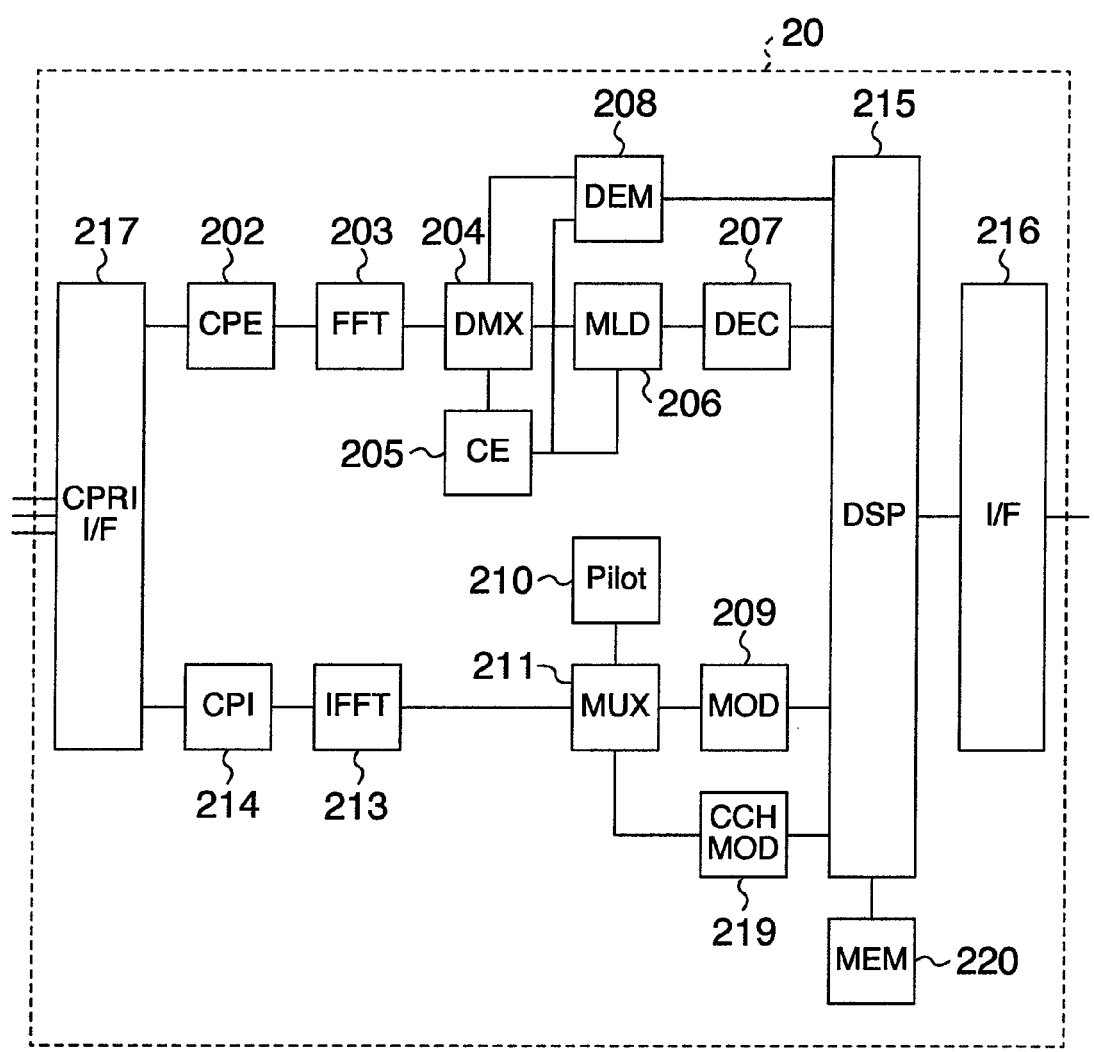
FIG. 9 is a diagram explaining a configuration of a base station device according to an embodiment of the present invention.
Figure 10:
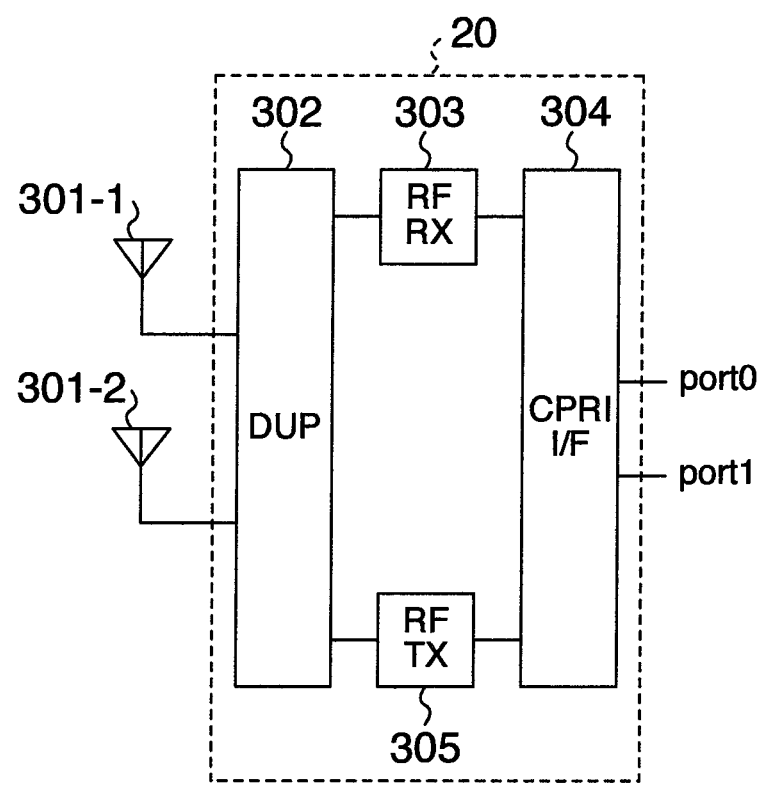
FIG. 10 is a diagram explaining a configuration of a wireless unit of the base station device according to an embodiment of the present invention.

FIG. 9 and FIG. 10 are diagrams explaining an embodiment of a construction in which the RF unit is separated in the base station device.

FIG. 9 shows an exemplary structure of the control unit of the RF-separated base station device, while FIG. 10 shows an exemplary structure of the RF unit of the RF-separated base station device.

The control unit shown in FIG. 9 communicates with the RF unit shown in FIG. 10 via CPRI (Common Public Radio Interface), which is an optical communications scheme. The operation of blocks other than the CPRI interface 217 is the same as that explained earlier with reference to FIG. 8. A base band signal that reached the RF unit via the CPRI interface depicted in FIG. 9 is transformed into radio frequency and is power-amplified by an RF-TX (radio transmitter) unit 305. The signal transformed into radio frequency is sent to an antenna 301 via a diplexer 302 and irradiated to the air. A signal received by the antenna is inputted into an RF-RX (radio receiver) unit 303 via the diplexer and transformed into a baseband signal. The transformed baseband signal is transmitted to the CPRI I/F 217 of the control unit depicted in FIG. 9 via the CPRI interface 304.

Next, an explanation will be given to the resource assignment in adjacent cells when the present invention is carried out.

Figure 11A:
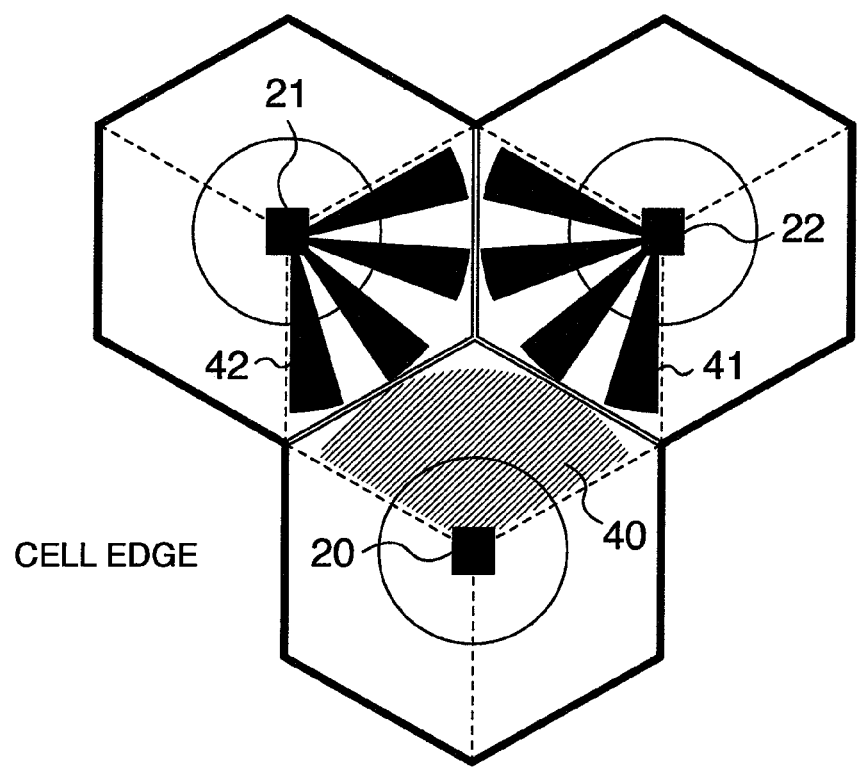
FIGS. 11A and 11B are diagrams explaining a concept of assigning resources among adjacent cells according to an embodiment of the present invention.
Figure 11B:
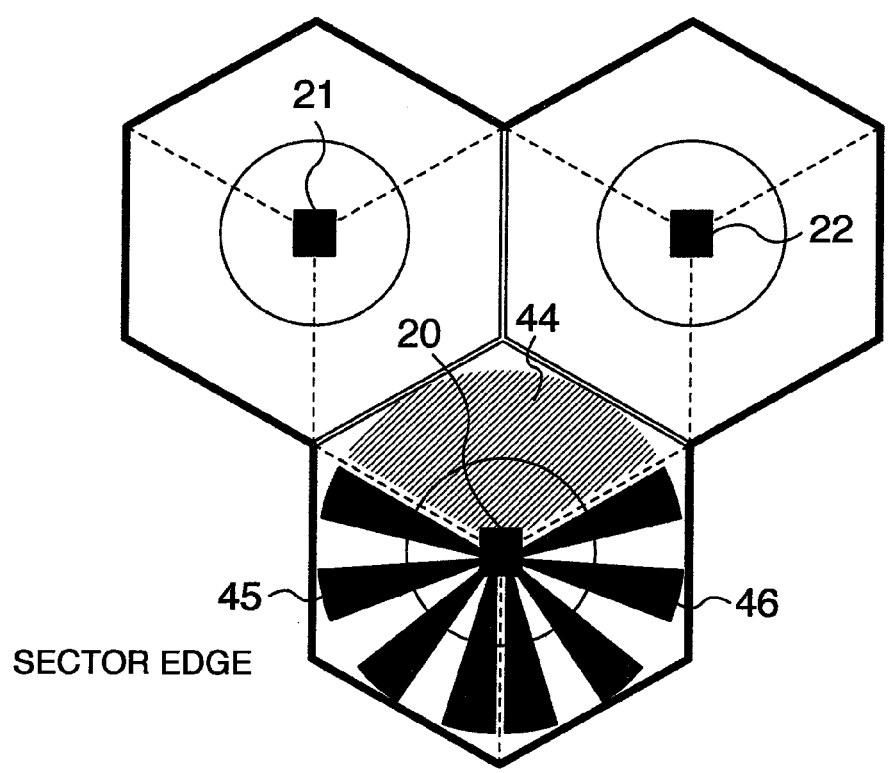

FIGS. 11A and 11B are diagrams illustrating a conception of resource assignment between adjacent cells according to an embodiment of the present invention.

FIGS. 11A and 11B show three base station devices 20, 21, and 22 which are adjacent to each other. Here, an explanation will be given to an exemplary case in which a sector 44 of the base station device 20 is congested.

First, a case will be explained in which interference with a mobile terminal device at a cell boundary is eliminated. In this example, it is assumed that the sector 44 of the base station device 20 is congested, while a sector 42 of the base station device 21 and a sector 41 of the base station device 22, which are adjacent to the sector 44 of the base station device 20 with cell boundaries therebetween, are non-congested. Here, "being non-congested" is a state in which a small number of people are using wireless communications in an area covered by the base station device. More specifically, the number of mobile terminal units performing wireless communications is smaller than a previously set threshold value. In contrast, the "being congested" is a state in which many people are using wireless communications in the area covered by the base station device. More specifically, the number of mobile terminal units performing wireless communications is larger than the previously set threshold value. It is necessary to accurately separate the words "cell" and "sector." However, as described earlier, a sector can be regarded as a cell which is constituted by angularly dividing a space using the directivity of an antenna. Therefore, it should be noted that the cell used in this specifications instead of the sector is also included in the scope of this invention. A specific method of autonomously determining whether or not a sector is congested will be described below in detail with reference to FIG. 14 and FIG. 15. According to the present invention, when eliminating the interference with mobile terminal units at the cell boundary after a determination of congestion or non-congestion, sectors 41, 42 adjacent to the congested sector 40 are caused to voluntarily restrict the use of a previously set frequency region, as is shown in FIG. 11A. As a result, the base station device 20 can use more resources in the frequency region, use of which is voluntarily restricted by the adjacent base stations, without being interfered by adjacent cells. Sectors 41, 42 depicted in FIG. 11A each have four fan shapes which represent a concept of intermittence. (Spatial intermittence by beam forming is not described herein, since the present invention does not deal with beam forms.)

Next, an explanation will be given to a processing of determining the presence or absence of empty resources between the base station devices and a processing of notification between the base station devices.

FIG. 12 is a flow chart explaining the processing of determining the presence or absence of empty resources in the base station device and the processing of notification between the base station devices.

The base station device periodically performs determination on congestion or non-congestion. First, within a period of determination thereof, the state of the base station device within a region is determined (step 401). If the base station is determined to be congested, then the process advances to step 407. If the base station is determined to be non-congested, then it is determined whether or not adjacent base station devices are also non-congested, or a check is made on information on an empty resource block (hereinafter referred to as RB) of the adjacent base station devices (step 402). If the adjacent base station devices are also determined to be non-congested, and have some empty RBs or empty RBs equal to or larger than a certain value, then the process advances to step 404. A specific method of checking the empty RB will be described later with reference to FIG. 25. If the adjacent base station devices have no empty RB or RBs equal to or less than a certain value, then the adjacent base station devices are determined to be congested, and the process advances to step 403, where an empty RB is decided and the use of the resource for the decided RB is voluntarily restricted.

Figure 1:
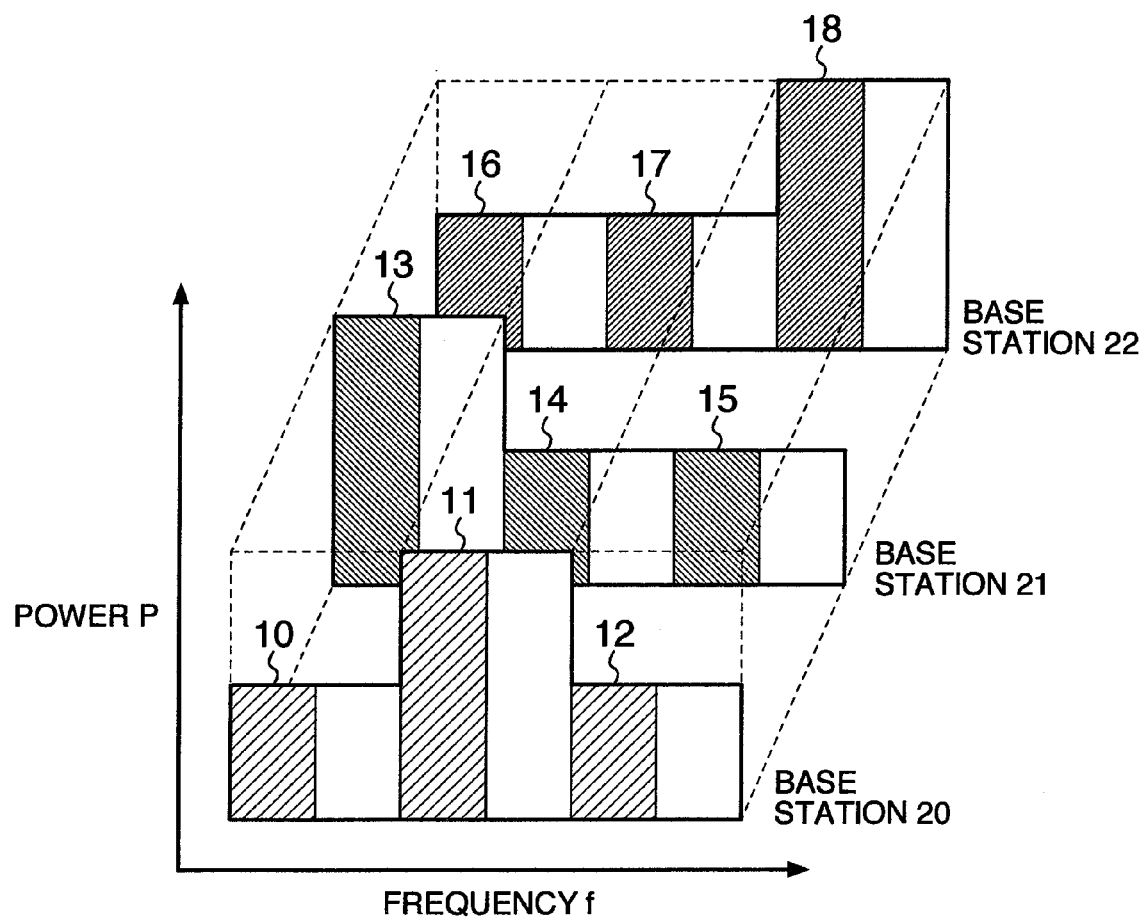
FIG. 1 is a diagram explaining an example of voluntarily restricting the use of resources according to an embodiment of the present invention.

FIG. 1 illustrates an example in which the use of resources is voluntarily restricted. Frequency region used by a base station device is assumed to be divided into, for example, 6 as shown in FIG. 1. It is previously set that, when adjacent station devices are determined to be congested, a base station device that is determined to be non-congested voluntarily restricts the use of the frequency region indicated by sloped lines in FIG. 1. When the adjacent station devices are determined to be congested, the base station device that is determined to be non-congested voluntarily restricts the use of the previously set frequency region depicted in FIG. 1. Specifically, the base station device divides a radio resource into a plurality of resource blocks and employs them for transmission of information. Therefore, the base station device empties the resources (13 to 18) by, for example, not beginning to use resource blocks in a low frequency region (on the left side in FIG. 1) corresponding to the frequency region indicated by sloped lines. Preferably, RB is gradually emptied instead of being suddenly emptied. After the RB is emptied, that is, an empty RB is decided, RNTP (Relative Narrowband Tx Power) described in the non-patent document 1 is used to transform the state of the RB into information. Then, the information is transmitted to adjacent base station devices as empty RB information at step 406.

When the base station device is determined to be congested at the step 401, empty RB is provided from adjacent base station devices that are determined to be non-congested. The provided RB is assigned to mobile terminal devices in descending order of the interference experienced by the mobile terminal devices (step 407).

Now an explanation will be given to a method of transforming the empty RB into information to generate the empty RB information.

Figure 18:
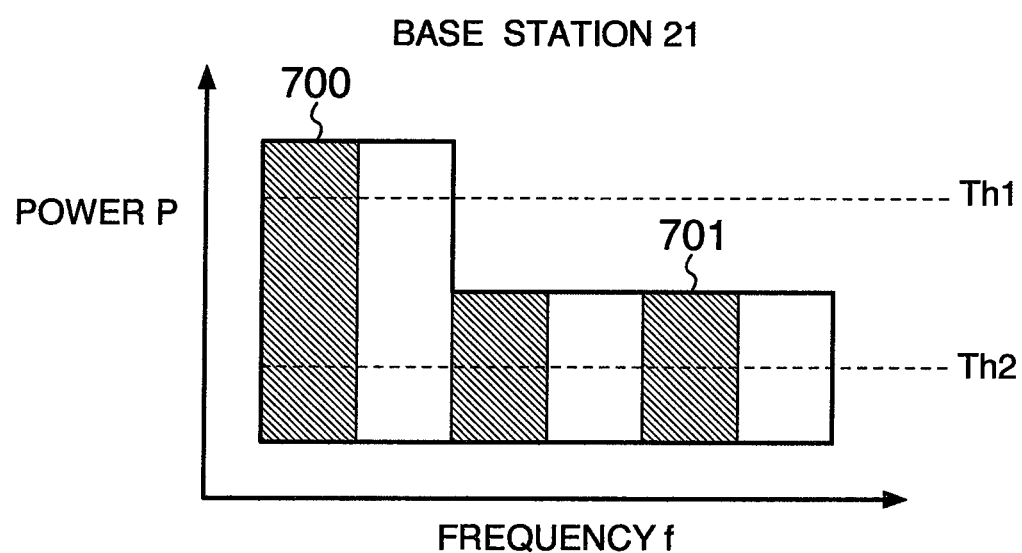
FIG. 18 is a diagram explaining the informatization of the state of the empty RB.

FIG. 18 is a diagram explaining the transformation of the state of the empty RB into information.

In order to transform the state of the empty RB into information, a threshold value of power is set, thus implementing transformation into information of "0" or "1" depending on whether the threshold value is exceeded. As is shown in FIG. 18, the power of R3 is more weighted than R1 by applying FFR. Therefore, different threshold values are set to each of R3 and R1. The transformation into the information of "0" or "1" is performed using the above described RNTP (Relative Narrowband Tx Power). RNTP transforms the state into the information that if a threshold is exceeded, then it is "1", and if not, it is "0". R3 and R1 are each provided with two threshold values Th1, Th2, and the state of the empty RB is determined by RNTP and transformed into the information of "0" or "1." This information is exchanged with the adjacent base station devices and resource information is shared. The exchange of information between the base station devices is performed using a message described in the non-patent document 1. More specifically, for example, the exchange of information between the base station devices can be performed by using X2 Interface for Load Indication.

Next, the determination of congestion/non-congestion will be described in a specific manner.

FIG. 14 is a flow chart illustrating a processing of determining whether or not a base station device is congested.

In the first place, the base station device calculates the average number of Active users existing in a region covered by the base station device (step 502). The average number of Active users is obtained by averaging, at a previously set period, the number of mobile terminal units that have become Active users. The Active users mean mobile terminal units that are performing wireless communications. Mobile terminal units that are not performing wireless communications are excluded here.

Next, it is checked if the current time is appropriate for determining whether the base station device is congested or not congested, and environmental conditions are also checked, including whether the base station device is located in a designated area (step 503). The determination of whether the base station device is congested or not congested should be performed at particular places in urban areas where traffic is concentrated. The determination of congestion or non-congestion should not be performed at areas where the base station devices become not congested and always non-congested, and areas where peripheral traffic is non-congested late at night even if they are located in urban areas. The reason is that when the base station device located in an area that straddles a plurality of cells, in terms of area and time, becomes non-congested, and when the use of available resources is restricted due to the determination as non-congestion, empty resources will not be used by any base stations, because the adjacent base station devices also become non-congested. If there are no congested base station devices, and the base station device in a non-congested state voluntarily restricts the use of the resources, resources remain unused by any base station devices, resulting in deteriorated efficiency.

If, at step 503, it is judged that it is not the case for executing determination of congestion/non-congestion, that is, it is judged that the determination of congestion/non-congestion is not necessary for the time band or the area, the state of the base station is determined as normal, with the process advancing to step 508. The "normal" means a state in which the base station device neither provides nor receives resources to and from adjacent base station devices. In contrast, if the environmental conditions are met in terms of the time and location of the base station device at step 503, then the process advances to step 505.

At a next step, comparison is made between the average number of Active users that is previously calculated at step 502 and a previously set threshold value L. If the average number of Active users is greater than the threshold L, then the base station device is determined be congested (step 507). The processing of determining whether or not the base station device is congested will be explained later with reference to FIG. 15.

In contract, if the average number of Active users is smaller than the threshold value L, then the base station device is determined to be non-congested (step 506).

After recognizing the state of self from the result of the determination at steps 504, 506, and 507, the base station device transmits the information on the congestion or non-congestion (Status Reporting) of itself to adjacent base station devices (step 508). Then, the determination of the congestion or non-congestion terminates.

Next, the processing of determining that the base station device is congested (step 507) will be explained.

FIG. 15 is a flow chart explaining the processing of determining whether or not the base station device is congested.

First, as is the case with the processing of determining that the base station device is non-congested, the average number of Active users is calculated at a previously set period (step 601).

Next, a comparison is made between the average number of Active users calculated at step 601 and a threshold value M (step 602). If the average number of Active users does not reach the threshold value M, then the state of the base station device is determined to be normal (step 604). If the average number of Active users is larger than the threshold value M, the base station device is determined to be congested (step 603). Then, the determination of congestion or non-congestion terminates.

Next, step 402 of checking empty RB information in adjacent base station devices will be explained in detail.

FIG. 13 is a flow chart explaining a method of checking the empty RB information in the base station device.

The base station device performs determination, periodically or following a control from a high-order device, on the congestion or non-congestion by carrying out the flow illustrated in FIG. 12, and transmits empty RB information to adjacent base station devices. Adjacent base station devices, which have received the empty RB information, store the empty RB information in a table to update the table storing the empty RB information to the most recent state.

FIG. 25 is a diagram showing an example of a configuration of an empty RB information table.

Each of the base station devices has the empty RB information table as shown in FIG. 25 in a memory 220 depicted in FIGS. 8 and 9. In the empty RB information table depicted in FIG. 25, information is stored that is represented by "0" "1" and that is obtained for each RB of for each sector of the adjacent base station devices using the RNTP as illustrated in FIG. 18. FIG. 25 represents an example in which empty RB is managed for each RB of the sector. However, it addition to that, a result of determination as a congested, non-congested, or normal state for each cell (sector) may be stored in the table for management. The result of determination as the congested, non-congested, or normal state is notified to adjacent base station devices at step 508 in FIG. 14.

Returning to the explanation of the method of checking the empty RB information, the base station device first refers to the empty RB information table and searches if there is an empty RB. If there is no empty RB, then the information search processing terminates (step 405).

If there is some empty RB information, the base station device operates to empty the same RP as the empty RB (step 406). This operation enables emptying the same RB as the empty RB in the adjacent base station devices.

The result of the above described simulations according to Embodiment 1 will be explained with reference to FIG. 19 to FIG. 21.

Figure 19:
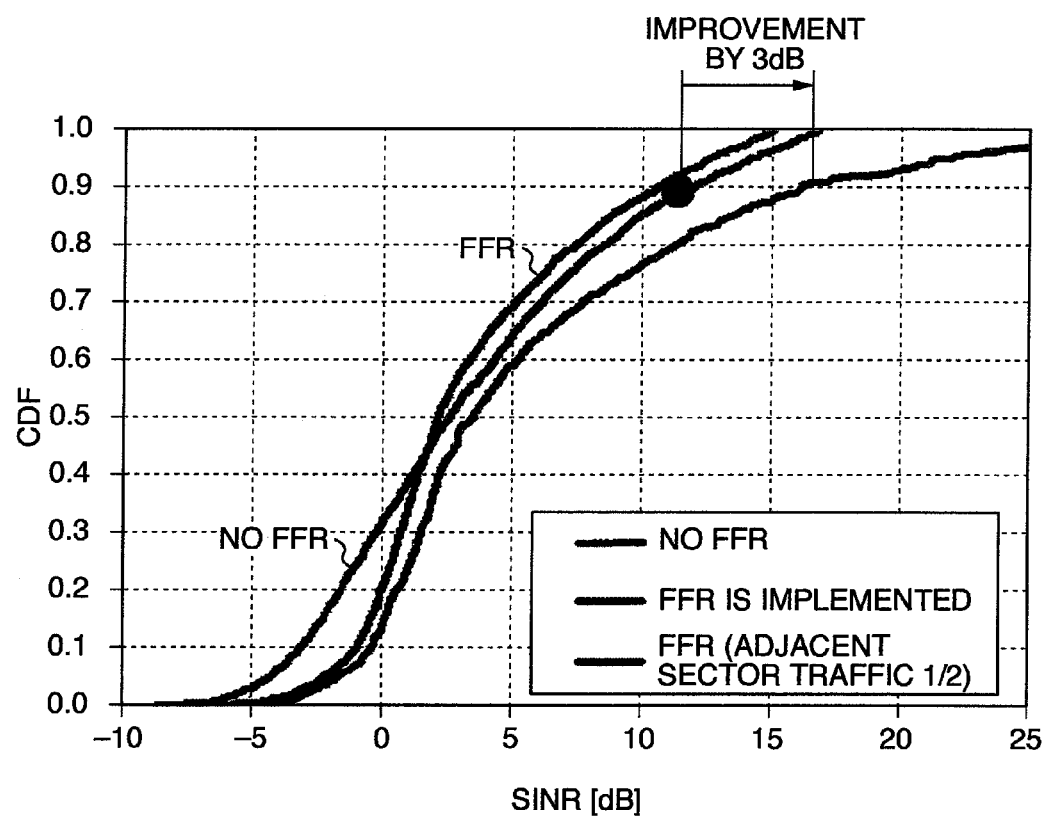
FIG. 19 is a diagram representing the result of a simulation according to an embodiment of the present invention.

FIG. 19 is a diagram showing the result of the simulation when the present invention is carried out among adjacent sectors.

Figure 20:
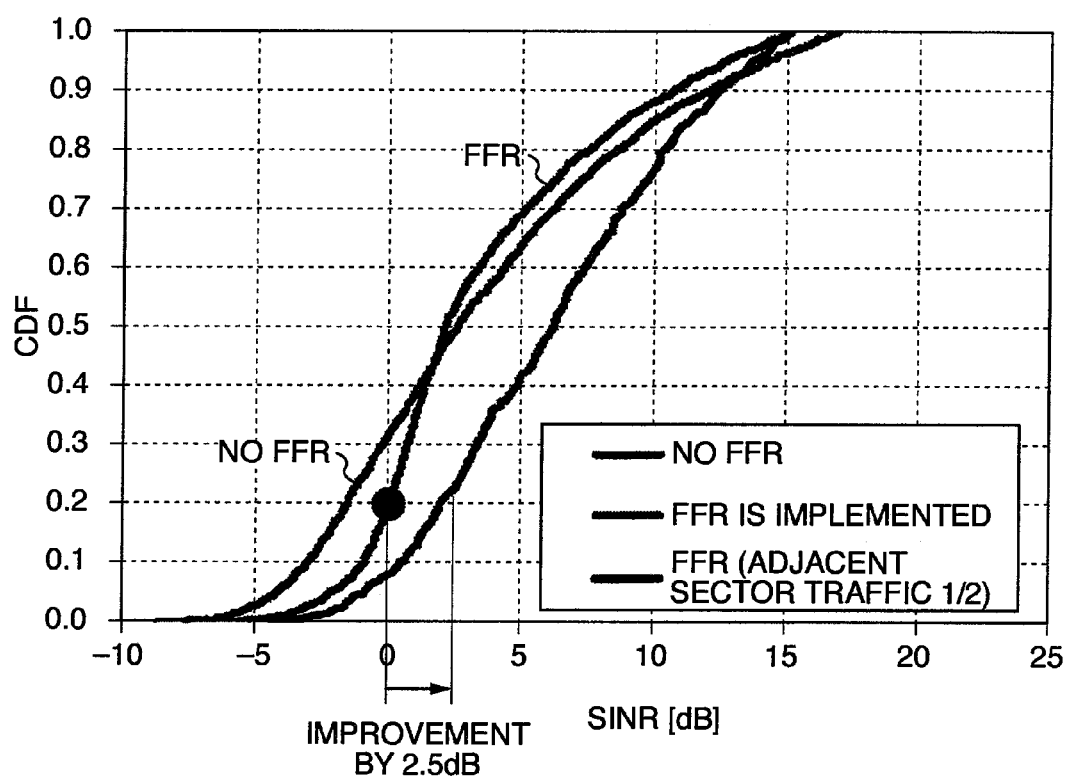
FIG. 20 is a diagram representing the result of a simulation according to an embodiment of the present invention.

FIG. 20 is a diagram showing the result of the simulation when the present invention is carried out among adjacent cells.

Figure 21:
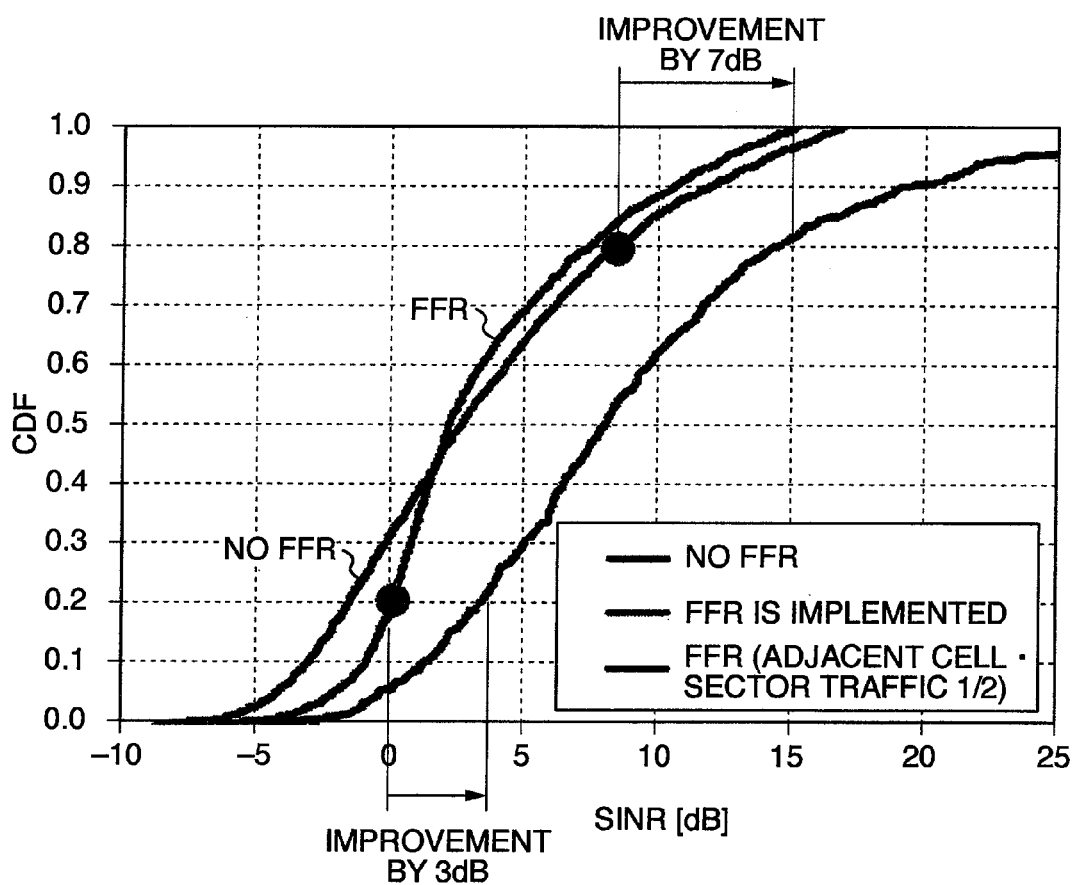
FIG. 21 is a diagram representing the result of a simulation according to an embodiment of the present invention.

FIG. 21 is a diagram showing the result of the simulation when the present invention is applied to both adjacent sectors and cells.

As FIG. 19 shows, when the present invention is carried out among adjacent sectors, SINR is improved more than when FFR is applied. Specifically, improvement is observed by 3 dB at a portion illustrated by a black dot. However, much improvement is not observed at portions of low SINR as compared with when FFR is applied.

As illustrated in FIG. 20, also in the simulation result in which the present invention is applied to the adjacent cells, SINR is improved more than when FFR is applied. An improvement by 2.5 dB is observed in a portion illustrated by a black spot. However, when the present invention is applied to the adjacent cells, in contrast to the simulation result of FIG. 19, much improvement is not observed in an area of high SINR, and a result in which the present invention is not applied is a little bit better in an area of very high SINR.

In the simulation result in which the present invention is applied to both adjacent sectors and cell as shown in FIG. 21, SINR is improved on the whole. From the above results of simulation, it could be confirmed that a great effect can be expected by applying the present invention to both adjacent sectors and adjacent cells.

Although the determination of whether the base station device is congested or not congested is performed by calculating the number of Active users in the above described embodiment, the present invention is not restricted to this. An average throughput may be a determination criterion. When the average throughput is used as the determination criterion, if the average throughput transmitted from a mobile terminal unit becomes, for example, a threshold value P or less, then the base station device is determined to be non-congested. In contrast, when it becomes a threshold value Q or more, the base station device is determined to be congested. The method of using the values transmitted from the mobile terminal unit as a determination criterion is also included in the scope of the present invention.

Embodiment 2

Embodiment 2 will be described below.

Embodiment 2 according to the present invention will be explained with reference to FIGS. 1, 8, 12, 13, 16 and 17. The explanation of parts identical to those of Embodiment 1 will be omitted.

FIG. 16 is a flow chart illustrating a processing of determining congestion/non-congestion according to Embodiment 2.

FIG. 17 is a flow chart illustrating a processing of determining whether or not the base station device is congested according to Embodiment 2. According to Embodiment 2, a threshold value for determination of congestion or non-congestion is automatically and adaptively changed.

Also in Embodiment 2, the determination of congestion or non-congestion, and automatic changing of the threshold value are performed by DSP 215 depicted in FIG. 8. The process shown in FIG. 12 is the same as that according to Embodiment 1. In Embodiment 2, the determination of congestion or non-congestion shown in FIG. 12 is the same as those illustrated in FIGS. 16 and 17.

The process of the determination of whether or not the base station device is congested according to Embodiment 2 will be explained with reference to FIG. 16.

In Embodiment 2, the base station device first checks the adjacent state at step 501.

Steps 502 to 507 are identical to those according to Embodiment 1.

In the present embodiment, if a determination is made as non-congested at step 506, then the state of adjacent base station devices is determined. That is, it is determined at step 509 whether or not all of the adjacent base station devices are non-congested. If all of the adjacent baste station devices are determined to non-congested, then the threshold value L that is employed for the determination of non-congestion at step 505 is changed, and the changed information is notified to the adjacent base station devices. The adjacent base station devices that were notified of the information also change the threshold value L (step 510). This operation prevents all of the adjacent base station devices from being determined to be non-congested. Moreover, it is possible to prevent the occurrence of a problem that resources, which are unlikely to be used by the adjacent base stations, are uselessly emptied. If the adjacent base station devices are determined to be other than being non-congested, then the process advances to step 508, where information regarding whether the base station device itself is congested or non-congested is transmitted to adjacent base station devices and the process of determination of non-congestion terminates.

The process of determining whether or not the base station device is congested will be described with reference FIG. 17.

Steps 601 to 604 are the same as those of Embodiment 1.

In Embodiment 2, if the base station device is determined to be congested at step 603, then it is determined whether or not all of the adjacent base station devices are congested at step 605. If all of them are determined to be congested, then a threshold value M that is used for the determination of congestion or non-congestion at step 603 is changed. Then, the changed threshold value is notified to adjacent base station devices. The adjacent base station devices which were notified of the information also change the threshold value M.

The process after the determination of congestion/non-congestion and the automatic changing of the thresholds in FIG. 17 and the process subsequent to step 402 depicted in FIG. 12, are the same as those of Embodiment 1.

According to Embodiment 2, it becomes possible avoid a situation in which all of the adjacent base stations are determined to be congested, thus making it possible to provide resources to a congested base station device that most requires to be provided with the resources (step 606). If the adjacent base stations are determined to be other than being non-congested, the determination of congestion or non-congestion terminates.

Embodiment 3

Next, Embodiment 3 will be explained with reference to FIGS. 1, 8, 12, 13, 16, 17, 22, 23, and 24. The explanation of parts identical to those of Embodiment 1 and Embodiment 2 will be omitted.

In Embodiment 3, when congested base station devices adjoin each other, the base station devices share the resources in a coordinated manner.

Figure 22:
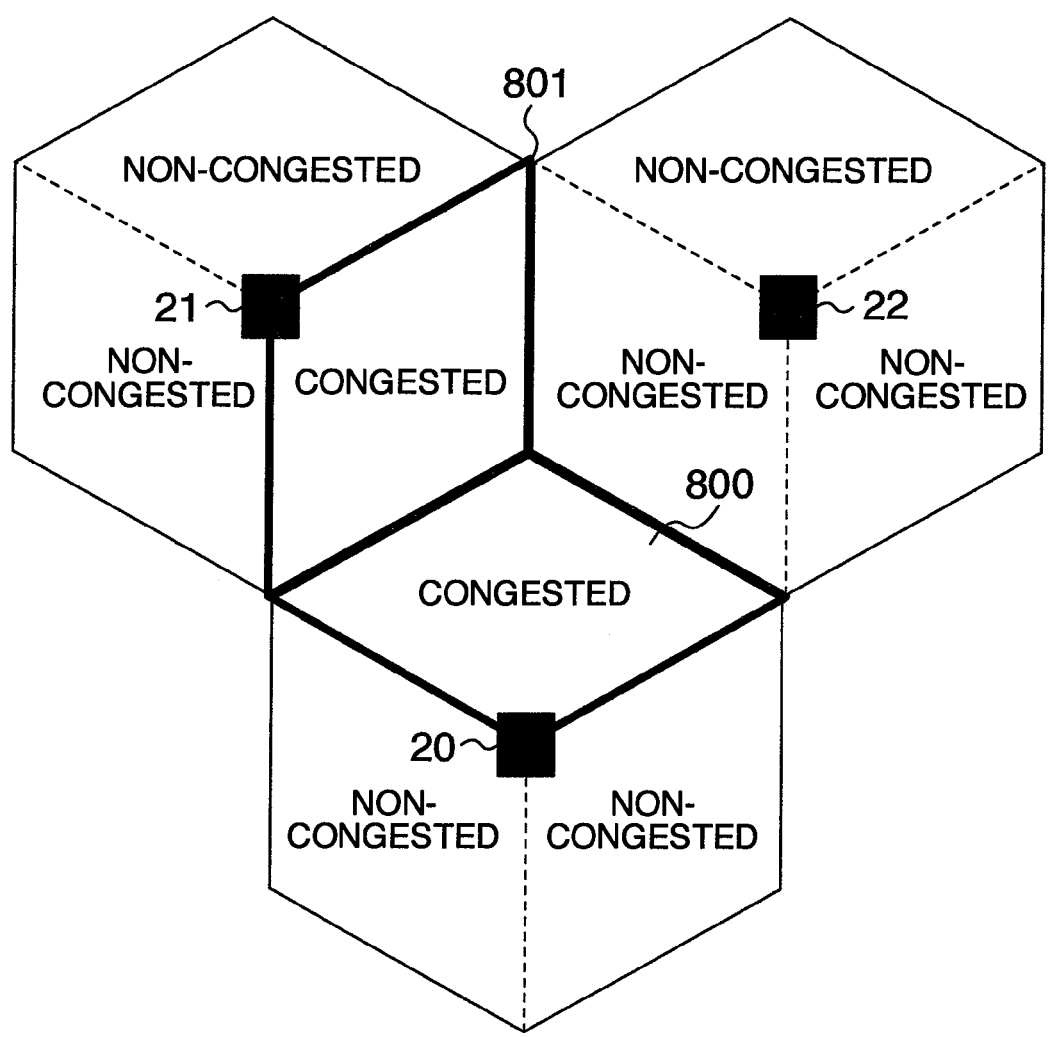
FIG. 22 is a diagram representing a relationship among adjacent base stations according to an embodiment of the present invention.

FIG. 22 is a diagram explaining a relationship among adjacent base stations when Embodiment 3 of the present invention is applied.

Figure 23:
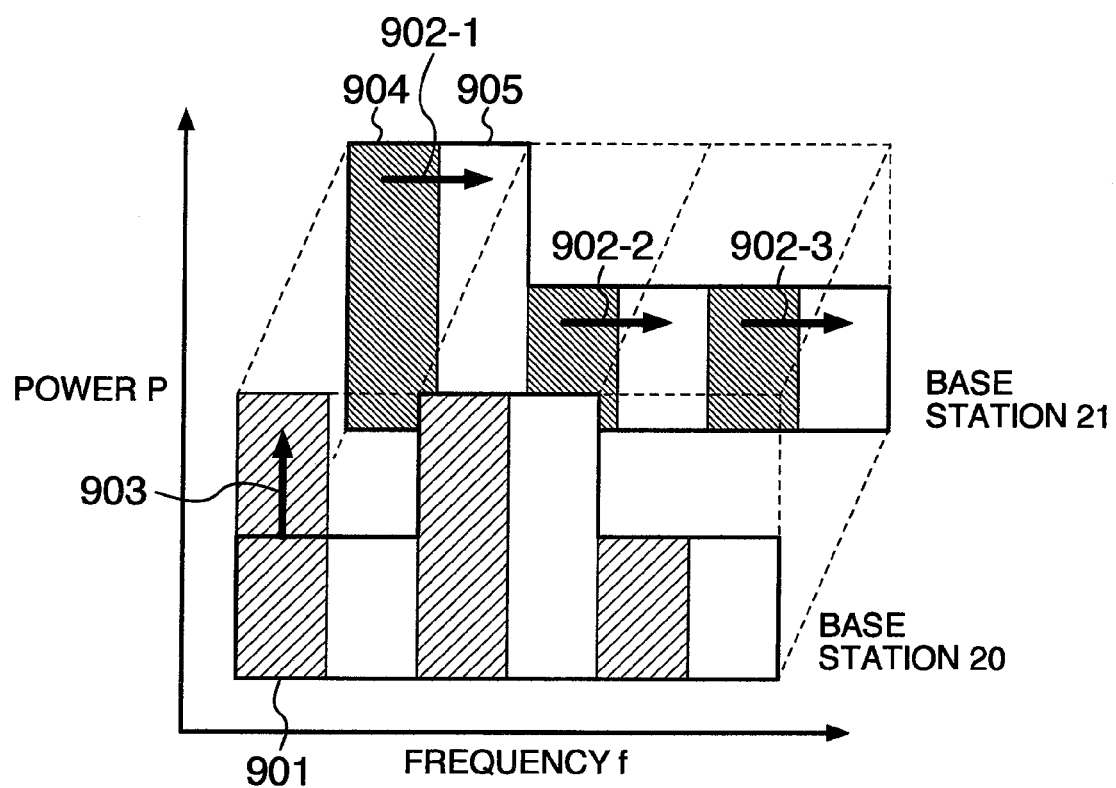
FIG. 23 is a diagram explaining an example of distribution of frequency resources among adjacent base station devices according to an embodiment of the present invention.

FIG. 23 is a diagram explaining an example of distribution of frequency resources among adjacent base station devices according to Embodiment 3.

Figure 24:
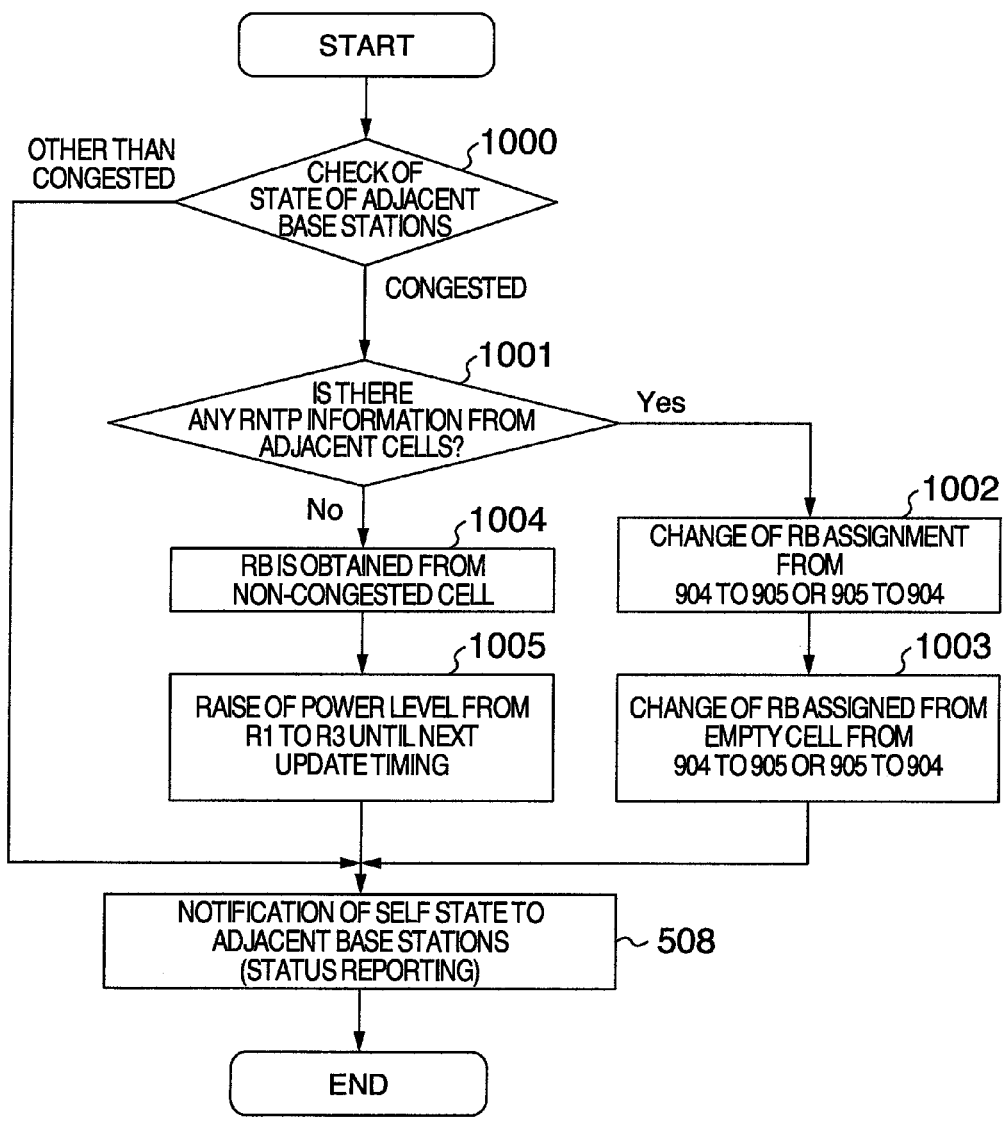
FIG. 24 is a flow chart explaining the content of processing in the base station device according to an embodiment of the present invention.

FIG. 24 is a flow chart explaining the content of the processing in the base station device in Embodiment 3 according to the present invention. In the flow chart, resources are shared by the adjacent base stations in a coordinated manner.

The processing of Embodiment 3 is also performed by the DSP 215 depicted in FIG. 8.

The process depicted in FIG. 12 is the same as those of Embodiment 1 and Embodiment 2. The content of the processing of determination of congestion/non-congestion shown in FIG. 12 is identical to those illustrated in FIGS. 16 and 17.

FIG. 22 shows a situation in which congested base station devices adjoin each other.

According to Embodiment 3, when a congested cell 800 of a base station device 20 is disposed next to a congested cell 801 of a base station device 21, they share resources in a coordinated manner.

A method according to Embodiment 3 will be described with reference to FIG. 24.

After the empty RB information is transmitted at step 404 in FIG. 12, the state of adjacent base station devices (cell) is checked (step 1000). If the adjacent cells are determined to be other than congested, then the process advances to step 508. If they are determined to be congested, then a check is made on whether or not RNTP information has been transmitted from adjacent cells (step 1001). If a self RNTP information table matches the RNTP information transmitted from the adjacent cells, then the process advances to step 1002. More specifically, in order to prevent the congested cell 800 of the base station device 20 from interfering with the congested cell 801 of the base station device 21 shown in FIG. 22, the base station device 21 changes the frequency to be assigned from RB904 to RB905 as shown in, for example, FIG. 23. The reverse thereof is also included in the scope of the present invention. Returning to FIG. 24, at a next step, RB904 of the non-congested cell, which is a provider of RB to the congested cell 801, is also changed to RB905. After it is changed, the process advances to step 508.

In the foregoing explanation, the combination ratio of the RB904 and RB905 is represented in 1/2 (50%) to permit easy understanding of the explanation. However, the ratio of RP may be changed to such as 0%, 10%, 20%, 30%, 40%, 60%, and 70% according to the level of non-congestion. This method of changing the ratio according to the level of non-congestion is also included in the scope of the present invention. If there is no RNTP information from the adjacent cell at step 1001, then the RB is provided from a non-congested cell (step 1004).

At a next, the power level of RB is raised from R1 to R3 until the next timing when the determination of congestion or non-congestion is periodically performed (step 1005). The raising of the power level enables the addition of RB that is used for the RNTP information, and enables the use of RB904 for the adjacent base stations. At step 508, information on whether self base station device is congested or non-congested is transmitted to adjacent base station devices.

This operation enables the resources to be shared in a coordinated manner even if congested cells or sectors adjoin each other, thus making it possible to avoid interferences at a cell boundary or at a sector boundary.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A base station for wirelessly communicating with a plurality of mobile terminal devices, said base station comprising:
   a control unit for controlling assignment of radio resources to said plurality of mobile terminal devices; and
   a storage unit, wherein:
      said base station is configured to divide radio resources that are available to the wireless communications with said mobile terminal devices into a plurality of resource blocks on a region represented by frequency and time base, and controls the assignment of said radio resources to said plurality of mobile terminal devices on said resource block basis; and
      said control unit is configured to determine whether or not a cell, located in a region where radio waves transmitted from said base station are reachable, is congested in a predetermined timing; to notify adjacent base stations of the determination result; to store the result of determination of congestion or non-congestion received from the adjacent base stations in the said storage unit; to check whether or not the adjacent base stations are congested, when said base station determined that said cell is not congested; to voluntarily restrict the use of resource blocks and to divide an empty resource block, when the adjacent base stations are congested; and to notify the adjacent base stations of information on the empty resource block.

2. The base station according to claim 1, wherein:
   when said base station determined that said cell is congested as a result of the determination of congestion or non-congestion, said control unit is configured to check information on empty resource blocks received from the adjacent base stations, and to assign said empty resource blocks to said mobile terminal devices within the cell.

3. The base station according to claim 2, wherein:
   when said empty resource blocks of said adjacent base stations are assigned to said mobile terminal devices within the cell of said base station, the assignment is performed to the mobile terminal devices located at a sector boundary in descending order of the interference experienced by said mobile terminal devices.

4. The base station according to claim 1, wherein:
   said determination of congestion or non-congestion is performed by comparing the average number of mobile terminal devices within said cell connected in a given time period or an average throughput of the mobile terminal devices in a given time period with a previously set threshold value.

5. The base station according to claim 4, wherein:
   when it is determined that said base station and all of said adjacent base stations are congested as a result of determination of congestion or non-congestion, said threshold value is changed by only a given value, and said determination of whether or not they are congested is performed again.

6. The base station according to claim 1, wherein:
   when it is determined that both said base station and said adjacent base stations are congested as a result of the determination of congestion or non-congestion, said resource blocks are distributed at a previously set ratio such that frequency bands will not overlap among said base station and said adjacent base stations, and said distributed radio resources are assigned to the mobile terminal devices within the cell of each of said wireless base station and adjacent base stations.

7. A method of assigning radio resources to a plurality of mobile terminal devices within a cell of a base station, comprising:
   dividing the radio resources available for wireless communications with mobile terminal devices into a plurality of resource blocks on a region represented by frequency and time base, and controlling assignment of said radio resources to said plurality of mobile terminal devices by the base station on said resource block;
   determining, by the base station, whether or not said cell is congested in a predetermined timing, notifying the determination result to adjacent base stations, and storing the result of determination of congestion or non-congestion received from said adjacent base stations, and
   when said base station determined that said cell is not congested, checking, by said base station, whether or not adjacent base stations are congested, and when said adjacent base stations are determined to be congested, voluntarily restricting the use of resource blocks to decide an empty resource block, and notifying said base stations of information on said decided empty resource block.

8. The radio resource assignment method according to claim 7, further comprising:
   when it is determined that said base station is congested as a result of said determination of congestion or non-congestion, making a check on information on empty resource blocks received from the adjacent base stations, and assigning the empty resource blocks to said mobile terminal devices within the cell.

9. The radio resource assignment method according to claim 8, further comprising:
   when said empty resource blocks of said adjacent base stations are assigned to said mobile terminal devices within the cell of said base station, performing said assignment to said mobile terminal devices located at a sector boundary in descending order of the interference experienced by said mobile terminal devices.

10. The radio resource assignment method according to claim 7, further comprising:
    performing said determination of congestion or non-congestion by comparing the average number of mobile terminal devices within said cell connected per a given time period or an average throughput of said mobile terminal devices per a given time period with a previously set threshold value.

11. The radio resource assignment method according to claim 10, further comprising:
    when it is determined that said base station and all of said adjacent base stations are congested as a result of said determination of congestion or non-congestion, changing said threshold value by only a given value, and said determination of whether or not they are congested is performed again.

12. The radio resource assignment method according to claim 7, further comprising:

when it is determined that both said base station and said adjacent base stations are congested as a result of the determination of congestion or non-congestion, distributing said resource blocks at a previously set ratio such that frequency bands will not overlap among said base station and said adjacent base stations, and said distributed radio resources are assigned to the mobile terminal devices within the cell of each of said wireless base station and adjacent base stations.

* * * * *